US 6,510,772 B2
Brickner, Jr. et al.
(45) Date of Patent: Jan. 28, 2003

(12) United States Patent
(10) Patent No.: US 6,510,772 B2

(54) DUST COLLECTION SYSTEM

(75) Inventors: Louis C. Brickner, Jr., Pittsburgh, PA (US); Ronald E. Young, Cheswick, PA (US); David N. Hollinger, Glenshaw, PA (US); Charles J. Baird, Pittsburgh, PA (US)

(73) Assignee: Delta International Machinery Corp., Jackson, TN (US)

(*) Notice: Subject to any disclaimer, the term of this patent is extended or adjusted under 35 U.S.C. 154(b) by 0 days.

(21) Appl. No.: 10/073,732

(22) Filed: Feb. 11, 2002

(65) Prior Publication Data

US 2002/0104416 A1 Aug. 8, 2002

Related U.S. Application Data

(62) Division of application No. 09/361,389, filed on Jul. 26, 1999.

(51) Int. Cl.[7] ................ B27B 5/29; B27B 5/26; B27B 27/08; B26D 7/06
(52) U.S. Cl. ................ 83/100; 83/165; 83/168; 83/471; 83/471.3; 83/581; 451/453; 451/456; 15/339
(58) Field of Search ............... 83/98, 100, 165, 83/168, 471.2, 485, 581, 471.3, 471; 451/453, 456; 15/339, 301

(56) References Cited

U.S. PATENT DOCUMENTS

| | | | | |
|---|---|---|---|---|
| 799,641 A | * | 9/1905 | Fox ........................ 451/456 |
| 1,447,765 A | * | 3/1923 | Dobyne .................. 451/456 |
| 1,552,553 A | * | 9/1925 | Georgia ................. 144/252.1 |
| 1,830,151 A | * | 11/1931 | Wilderson ................ 83/162 |
| 1,888,679 A | * | 11/1932 | Knapp ................... 451/456 X |
| 2,399,239 A | * | 4/1946 | Martin .................... 451/213 |
| 2,691,792 A | * | 10/1954 | Humphrey .............. 15/339 X |
| 2,839,102 A | * | 6/1958 | Kido ....................... 83/100 |
| 3,135,151 A | * | 6/1964 | Link et al. ............. 83/100 X |
| 3,170,184 A | * | 2/1965 | Jepson et al. ........... 15/339 X |
| 3,262,471 A | | 7/1966 | McCarty ................. 30/377 |
| 3,322,169 A | * | 5/1967 | Hilliard .................... 83/100 |
| 3,401,724 A | * | 9/1968 | Kreitz .................... 83/471.3 |
| 3,506,998 A | * | 4/1970 | Perry ....................... 15/339 |
| 3,514,906 A | * | 6/1970 | Everett ................. 451/456 X |
| 3,565,139 A | | 2/1971 | Olson ...................... 83/859 |
| 3,882,598 A | | 5/1975 | Earle et al. .............. 30/390 |
| 3,958,474 A | * | 5/1976 | Kreitz ..................... 83/100 |
| 3,971,274 A | * | 7/1976 | Barton ..................... 83/100 |

(List continued on next page.)

FOREIGN PATENT DOCUMENTS

| JP | 3-108401 | * 11/1991 |
|---|---|---|
| JP | 3-112301 | * 11/1991 |

OTHER PUBLICATIONS

Parts Listing for Delta Model 36–210 10 Motorized Compound Miter Saw, Dec. 9, 1998.*
Instruction Manual for Delta Model 36–210 10 Compound Miter Saw, Apr. 1, 1996.*
"Sliding Compound Miter Saws", Woodworker's Journal, May/Jun. 1997, pp. 80–86.*
HITACHI Electric Power Tools Product Listing.*
HITACHI Power Tools Product Listing.*

*Primary Examiner*—Charles Goodman
(74) *Attorney, Agent, or Firm*—Kirkpatrick & Lockhart LLP

(57) ABSTRACT

Apparatus includes a first member and a second member. The first member includes a first surface and the second member includes a driven member. The second member is movable relative to said first member between a first position and a second position, wherein the driven member is closer to the first surface in the second position than in the first position. The second member includes an inlet, an outlet, and an enclosed pathway between the inlet and the outlet. A collector is movably coupled to the second member at the inlet and communicates with the inlet.

16 Claims, 19 Drawing Sheets

U.S. PATENT DOCUMENTS

| | | | | |
|---|---|---|---|---|
| 4,063,478 A | * | 12/1977 | Stuy | 83/100 |
| 4,151,705 A | * | 5/1979 | Evans | 451/456 X |
| 4,241,505 A | * | 12/1980 | Bodycomb et al. | 83/100 X |
| 4,253,362 A | * | 3/1981 | Olson | 83/100 |
| 4,326,864 A | | 4/1982 | Sittler | 55/364 |
| 4,403,534 A | * | 9/1983 | Altendorf et al. | 83/100 |
| 4,596,060 A | * | 6/1986 | Schmidt et al. | 15/301 X |
| 4,607,413 A | * | 8/1986 | Schmidt et al. | 15/301 |
| 4,675,999 A | | 6/1987 | Ito et al. | 30/124 |
| D295,823 S | | 5/1988 | Brickner et al. | D15/133 |
| 4,875,398 A | * | 10/1989 | Taylor et al. | 83/100 |
| 4,932,449 A | | 6/1990 | Omoto | 144/252.1 |
| D310,375 S | | 9/1990 | Brickner et al. | D15/133 |
| 4,972,749 A | | 11/1990 | Grove | 83/468.2 |
| 5,012,583 A | * | 5/1991 | Blochle et al. | 30/392 |
| 5,020,406 A | | 6/1991 | Sasaki et al. | 83/397 |
| 5,054,352 A | | 10/1991 | Fushiya et al. | 83/468.3 |
| 5,063,634 A | * | 11/1991 | Hafele et al. | 15/339 X |
| 5,063,802 A | * | 11/1991 | Shiotani et al. | 83/98 |
| 5,146,826 A | | 9/1992 | Shiotani et al. | 83/468.2 |
| D331,416 S | | 12/1992 | Fushiya et al. | D15/133 |
| 5,172,680 A | * | 12/1992 | Swan | 83/100 X |
| 5,197,365 A | | 3/1993 | Clifton | 83/468 |
| D345,743 S | | 4/1994 | Garcia | D15/133 |
| D346,173 S | | 4/1994 | Price | D15/133 |
| D348,272 S | | 6/1994 | Brickner | D15/133 |
| 5,421,228 A | | 6/1995 | Fukinuki | 83/471.3 |
| 5,425,294 A | | 6/1995 | Ushiwata et al. | 83/471.3 |
| 5,445,056 A | * | 8/1995 | Folci | 83/100 |
| 5,495,784 A | * | 3/1996 | Chen | 83/471.2 |
| 5,537,748 A | * | 7/1996 | Takahashi et al. | 83/100 X |
| D376,806 S | | 12/1996 | Holly et al. | D15/133 |
| 5,588,213 A | * | 12/1996 | Swanberg | 30/124 |
| 5,594,972 A | * | 1/1997 | Iversen | 451/456 X |
| 5,752,422 A | * | 5/1998 | Inoue et al. | 83/581 X |
| 5,782,279 A | * | 7/1998 | Stecker, Sr. | 83/471.2 X |
| 5,819,619 A | * | 10/1998 | Miller et al. | 83/100 |
| 5,862,732 A | | 1/1999 | Itzov | 83/471.3 |
| 5,865,079 A | | 2/1999 | Itzov | 83/471.3 |
| 5,907,987 A | | 6/1999 | Stumpf et al. | 83/471.3 |
| 5,927,171 A | * | 7/1999 | Sasaki et al. | 83/165 |
| 5,931,072 A | * | 8/1999 | Shibata | 83/98 |
| 6,079,078 A | * | 6/2000 | Bylington | 15/339 |
| 6,289,778 B1 | * | 9/2001 | Wixey | 83/581 X |

* cited by examiner

DUST COLLECTION SYSTEM

CROSS-REFERENCE TO RELATED APPLICATIONS

This application is a divisional application of U.S. patent application Ser. No. 09/361,389 filed Jul. 26, 1999.

TECHNICAL FIELD AND INDUSTRIAL APPLICABILITY OF THE INVENTION

The present invention relates to an improved dust collection system and, more particularly, relates to a dust collection system that more effectively collects dust or other particulate matter generated by a driven member of a cutting or abrading device and directs the matter away from a workpiece support surface of the device. The present invention also relates to devices including a driven member for cutting or abrading a workpiece of wood, metal, or another material and that incorporate the improved dust collection system of the present invention. The improved dust collection system of the present invention may be advantageously incorporated into any device having a driven cutting or abrading member that generates dust or other particulate matter on contacting a workpiece of wood, metal, or another material.

BACKGROUND OF THE INVENTION

A saw blade separates wooden workpieces into separate portions by removing a thin region of the workpiece to free the portions. The thickness of the region removed by the saw blade corresponds to the saw blade thickness or "kerf". Saw blades, whether of the circular, continuous band, elongate, or bayonet type, include a series of blade teeth separated by recesses known as gullets. As the blade teeth pass through the workpiece, each tooth removes a portion of the workpiece into a fine particulate matter commonly referred to as sawdust. The sawdust collects in the gullets of the portion of the saw blade disposed within the cut in the workpiece, and the gullets transport the sawdust out of the cut, whereupon it is released into the atmosphere. If the sawdust is not efficiently conveyed out of the cut in the workpiece by the gullets, the quality of the cut is compromised. The blade teeth may, in the extreme, be unable to advance further into the workpiece and the saw blade will experience a jam. Significant effort is put into efficiently designing saw blades to quickly remove material from workpieces and effectively convey sawdust out of the cut in the workpiece.

The natural result of efficient saw blade design is the generation of significant amounts of sawdust during cutting operations. The sawdust may obscure the saw operator's view of the workpiece and also may require the operator or his assistants to spend significant time cleaning the shop or job site to remove the sawdust after completing the cutting operation. If the saw is of the portable type and is used within a living or work space such as the home or office, generation of sawdust is particularly problematic and may require a significant and immediate clean-up effort. Chop saws and miter saws, for example, commonly are used in existing homes to cut crown and other molding during renovation and remodeling. Such saws typically include quickly rotating, aggressive circular saw blades that may generate substantial volumes of dust within the home. Thus, there remains an ongoing effort to design chop saws, miter saws, and other woodworking saws, for example, with dust collection systems to minimize the dispersal of sawdust into the atmosphere.

An example, of a miter saw incorporating a known dust collection system is the Delta™ Model No. 36-210 10" Compound Miter Saw ("the Delta Saw"). As shown in FIG. 5, the Delta saw 10 is of a conventional design and includes a table 12 rotatably mounted on a stationary base 14 including two side portions 16a, 16b. The rotatable table 12 includes a primary workpiece support surface 18, which is flanked by the paired secondary workpiece support surfaces 20a, 20b of the side portions 16a, 16b, respectively. A one-piece workpiece fence 24 is secured to the secondary support surfaces 20a, 20b and is disposed across the primary support surface 18. A saw unit 26 is pivotally mounted to a pivot assembly 28 that is connected to the rotatable table 12. Thus, as the rotatable table 12 is rotated from the 0° miter angle position shown in FIG. 5, the saw 10 may execute miter cuts on a workpiece disposed on the primary and secondary workpiece support surfaces 18, 20a, 20b and against the support surfaces 30a and 30b of the one-piece workpiece fence 24.

The saw unit 26 of the Delta saw 10 includes a cutting unit 32 within which the circular saw blade 34 rotates. A dust transmission pathway is defined within the cutting unit 32 between an inlet 36, to the rear of the saw blade 34, and an outlet chute 38, which is connected to the upper surface of the cutting unit 32. A portion of the sawdust generated by the saw blade 34 enters the inlet 36, and the airflow generated by rotation of the circular saw blade 34 promotes passage of that portion of the sawdust through the dust transmission pathway and out the outlet chute 38. A bag or a vacuum hose system may be attached to the outlet chute 38 to collect the sawdust. The saw may be designed so that the saw blade-generated airflow effectively transmits sawdust that enters the inlet 36 through the dust transmission pathway. Some portion of the generated sawdust, however, is not directed into the inlet 36 during the cutting operation and, instead, is dispersed onto the primary and secondary workpiece support surfaces 18, 20a, and 20b and into the surrounding areas. The fraction of generated sawdust that enters the inlet 36 will depend on such factors as the particular design and rotational speed of the saw blade, the composition of the workpiece, the geometry of the cut, etc. It is possible that a significant fraction of the sawdust will not be directed into the inlet 36 and, instead, will be dispersed onto the miter saw 10 and its surroundings.

Accordingly, a need exists for an improved system for collecting sawdust generated during cutting operations on a miter saw or chop saw. More generally, there exists a need for an improved system for collecting dust or other particulate matter, sawdust or otherwise, in devices incorporating a driven cutting or abrading member that generates dust on contacting a workpiece of wood, metal, or another material. In addition to woodworking miter and chop saws, such devices include, for example, other woodworking cutting devices, sanding devices, metalworking saws, tile cutting saws, and masonry saws.

BRIEF SUMMARY OF THE INVENTION

The present invention addresses the foregoing need by providing an apparatus incorporating an improved dust collection system. The apparatus includes a first member having a first surface including a recess. The apparatus also includes a second member having a driven member mounted thereon. The second member of the apparatus is movable between a first position and a second position relative to the first member, wherein the driven member is closer to the first surface when the second member is in the second position than in the first position. The second member includes a dust collection system having an inlet, an outlet, and an enclosed pathway between the inlet and the outlet. At least a portion of the inlet is disposed within the recess in the first surface when the second member is in the second position.

The apparatus preferably includes a collector positioned at the inlet and which is for receiving dust or other particulate matter generated by the driven member. At least a portion of the collector is disposed within the recess in the first surface when the second member is in the second position. The driven member of the apparatus may be rotatably or otherwise movably mounted on the second member. The driven member may be, for example, a cutting member or an abrading member. As used herein, "cutting" refers to the act of either severing a workpiece into two or more distinct pieces or placing a cut in a workpiece. As used herein, "abrading" refers to the act of sanding, grinding, or otherwise wearing away a surface of a workpiece. A non-exhaustive list of possible cutting members that may incorporated in the device of the present invention includes, for example, woodworking saw blades, metalworking saw blades, tile cutting blades, masonry cutting blade, and sanding disks, drums and belts.

In one embodiment of the apparatus of the invention, the apparatus is a miter saw or chop saw, the first member is a base, the first surface is a workpiece support surface, and the second member is the saw's cutting unit. A circular saw blade is rotatably mounted to the second member. The cutting unit is pivotable relative to the base between the first and second positions. The cutting unit includes a collector positioned at the inlet and which includes a collector inlet. The collector covers a peripheral region of the saw blade and directs a portion of the generated sawdust entering the collector through the collector inlet into the enclosed pathway toward the outlet in the cutting unit. A portion of the collector is received within the recess in the workpiece support surface when the cutting unit is in the second position.

The present invention also is directed to an adjustable support system that may be incorporated into any device having a workpiece support surface. The adjustable support system includes at least one adjustable support member movably mounted to the device. Preferably, an adjustable support member includes a support element having a support surface and one or more sliding members. The one or more sliding members are slidingly received by the device, and a distance between the support element and the device may be varied by sliding the sliding members relative to the device.

The present invention is further directed to an apparatus including a first member including a first surface and a second member that includes a driven member mounted thereon. The second member is movable relative to the first member between a first position and a second position. The driven member is closer to the first surface when the second member is in the second position than in the first position. The second member includes an inlet, an outlet, and an enclosed pathway therebetween, and a collector is provided at the inlet and is movable relative to the second member.

The reader will appreciate the foregoing details and advantages of the present invention, as well as others, upon consideration of the following detailed description of embodiments of the invention. The reader also may comprehend such additional details and advantages of the present invention upon using the invention.

BRIEF DESCRIPTION OF THE DRAWINGS

The features and advantages of the present invention may be better understood by reference to the accompanying drawings, in which like reference numerals refer to like elements and in which.

DESCRIPTION OF EMBODIMENTS OF THE INVENTION

While the present invention is susceptible of embodiment in many different forms, this specification and the accompanying drawings disclose only specific forms as examples of the invention. The invention, however, is not limited to the embodiments so described, and the scope of the invention is better described in the appended claims. In addition, the dust collection system of the invention may be used with certain conventional devices such as, for example, chop saws, miter saws, and other material cutting and/or abrading devices having a driven member that generates a sawdust or other particulate matter as the driven member contacts a workpiece. The details of those conventional devices, although not fully described or illustrated herein, will be apparent to those having ordinary skill in the art.

For ease of description, the present dust collection system invention and devices in which it is incorporated may be described herein in a normal operating position, and terms such as upper, lower, front, back, horizontal, proximal, distal, etc., may be used with reference to the normal operating position of the referenced device or element and/or the normal position of an operator using the invention in a device in which it is incorporated. It will be understood, however, that the invention may be manufactured, stored, transported, used, and sold in orientations other than the positions described.

Figure 1:
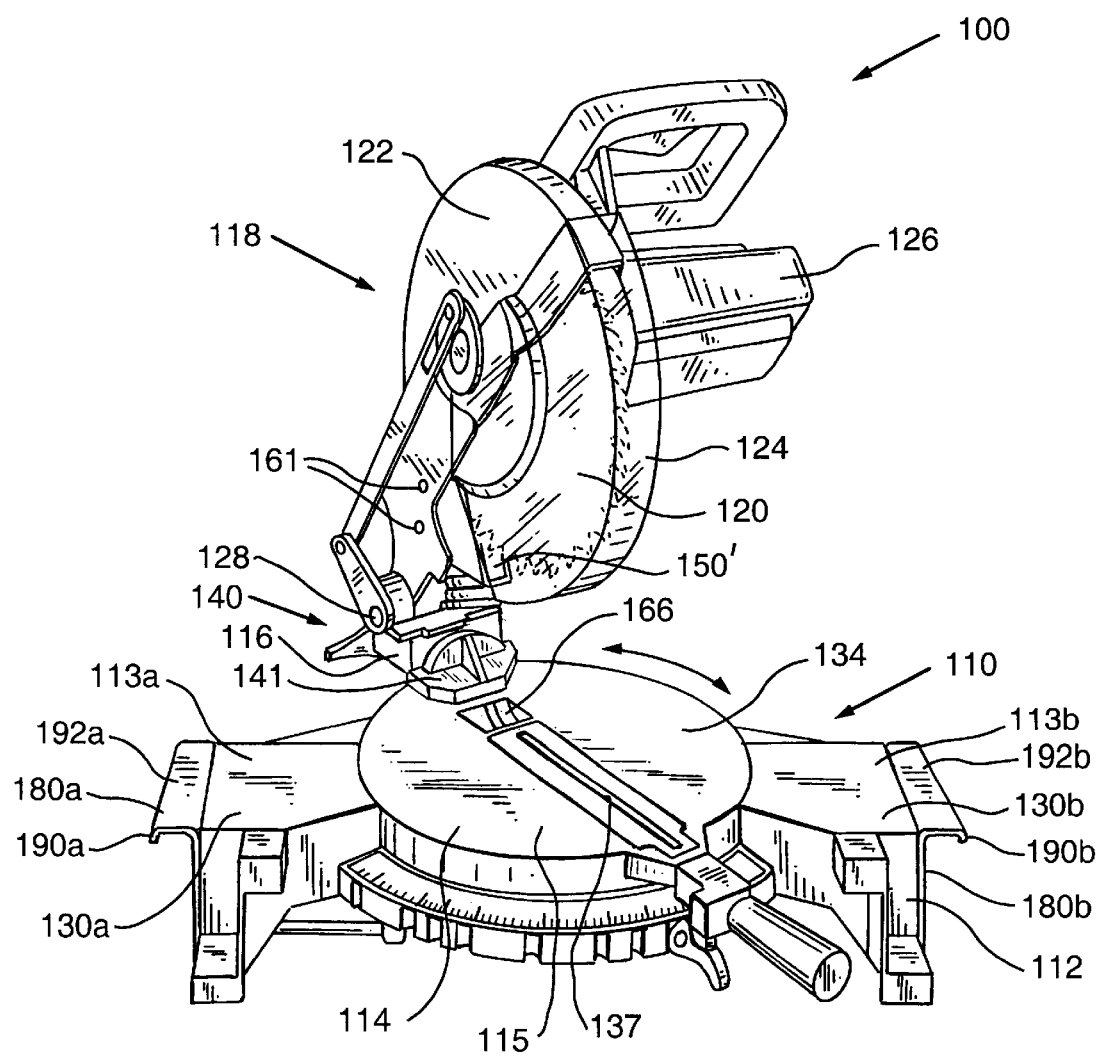
FIG. 1 is a perspective view of an embodiment of a compound miter saw including a dust collection system constructed according to the present invention, and wherein the saw unit is pivoted upward and away from the saw's workpiece support surface.
Figure 2:
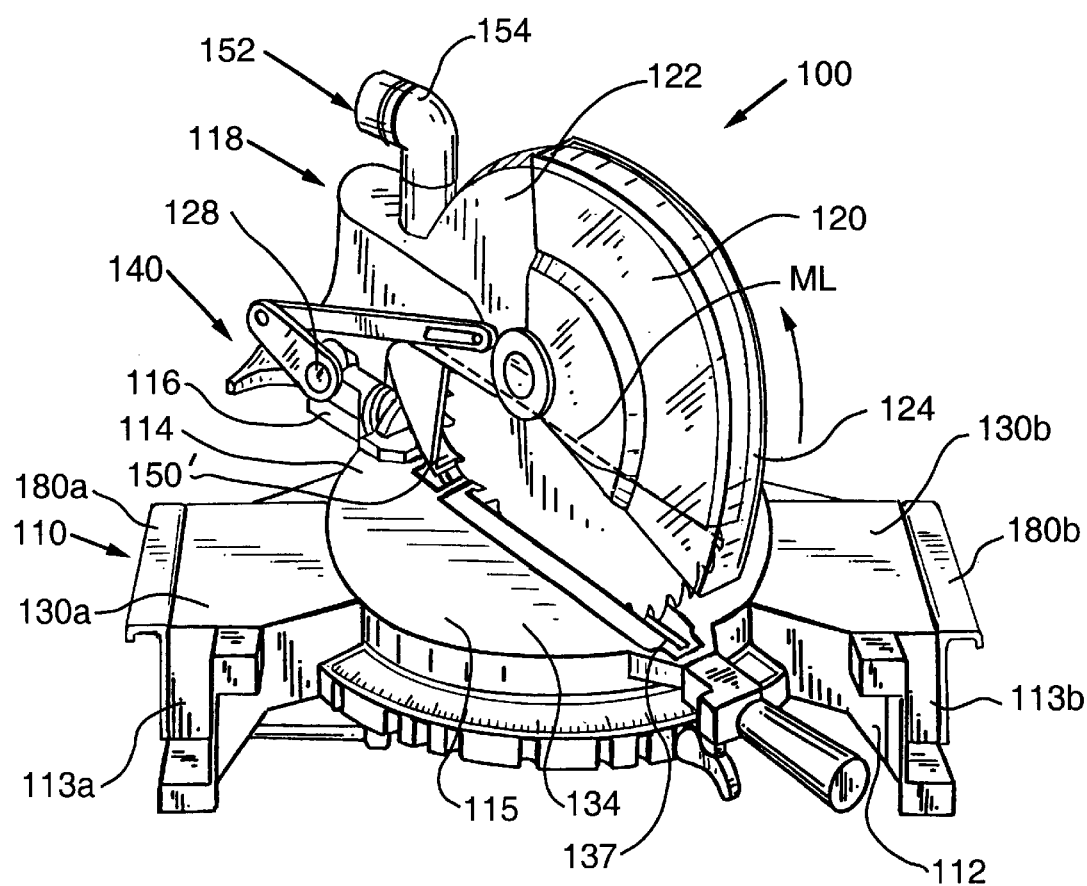
FIG. 2 is a perspective view of the compound miter saw shown in FIG. 1, and wherein the saw unit is pivoted downward and the saw blade partially resides within the slot in the workpiece support surface.

Referring now to the drawings, which are for the purpose of illustrating embodiments of the present invention and not for the purpose of limiting the same, FIGS. 1 and 2 depict a cutting device in the form of a miter saw 100 incorporating an embodiment of the dust collection system of the present invention. The miter saw 100 includes base 110 for supporting the miter saw 100 on a workbench or other surface. The base 110 includes a base portion 112 including two opposed side portions 113a and 113b. The base 110 also includes a table portion 114 having a surface 115. The table portion 114 is movably mounted to the base portion 112 and may rotate relative to the base portion 112, as indicated by the double-headed arrow in FIG. 1. The miter saw 100 also includes a mounting assembly 116 that is fixedly mounted to the rear of the table portion 114. A tool unit in the form of a cutting unit 118 includes a cutting member in the form of a circular saw blade 120, a fixed guard 122 covering an upper portion of the saw blade 120, and a transparent movable guard 124 that movably covers a lower portion of the saw blade 120. The circular saw blade is 120 selectively driven to rotate by motor 126, which is mounted on the cutting unit 118. The cutting unit 118 is movably connected to the mounting assembly 116 at a pivot axis 128.

Figure 8:
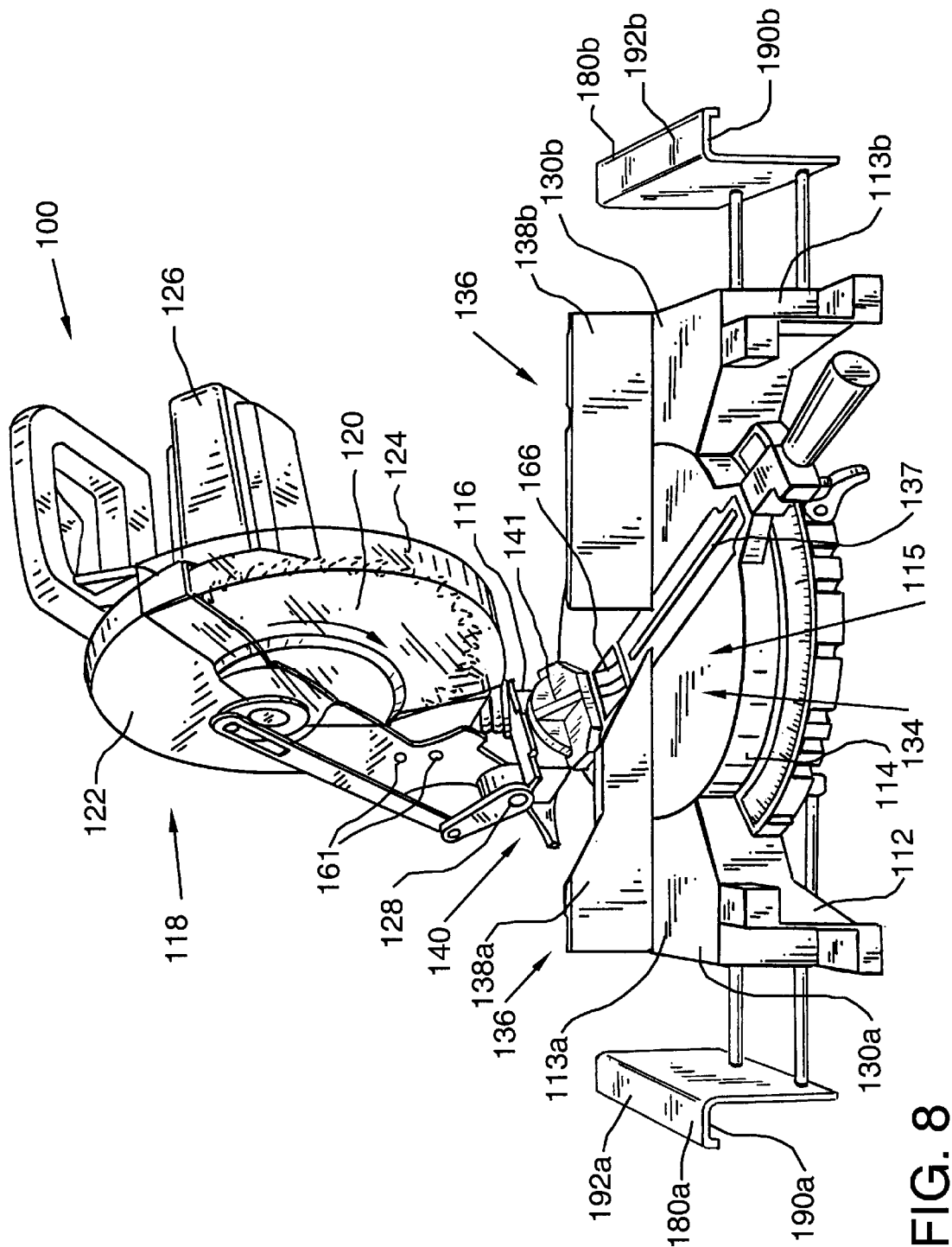
FIG. 8 is a perspective view of the compound miter saw shown in FIGS. 1–4, and wherein the adjustable supports are partially extended away from the side walls.

Each of the side portions 113a and 113b includes an upper surface 130a and 130b, respectively. The surfaces 115, 130a, and 130b are generally coplanar and together form a workpiece support surface 134 on which a workpiece to be cut by the miter saw 100 is supported. It will be understood that depending on the size of the workpiece to be cut by the miter saw 100, the workpiece may be supported only on the surface 115 or on the surface 115 in combination with one or both of the upper surfaces 130a and 130b. As indicated in FIG. 1, the surface 115 includes a slot 137, which may receive a portion of the circular saw blade 120 when the cutting unit 118 assumes certain positions. The miter saw 100 also includes a workpiece fence 136, which is shown in FIG. 8. The fence 136 has been removed from the depictions of the miter saw 100 in FIGS. 1 and 2 to better show various other aspects of the miter saw 100. The workpiece fence 136 includes workpiece abutment surfaces 138a and 138b against which a workpiece may be supported during cutting operations.

The cutting unit 118 may pivot about the pivot axis 128 relative to both the mounting assembly 116 and the attached table portion 114 so as to be configurable in a first position, a second position, and any of the various positions intermediate the first and second positions. In the first position, shown in FIG. 1, the cutting unit 118 is pivoted fully upward and away from the workpiece support surface 134. As is known in the art, the miter saw 100 may include, for example, one or more springs or other biasing members that bias the cutting unit 118 toward the first position. In the second position, shown in FIG. 2, the cutting unit 118 is pivoted about the pivot axis 128 fully downward toward the workpiece support surface 134, and a portion of the circular saw blade 120 passes into the slot 137 in the table portion 114. The cutting unit 118 also passes through each of the positions intermediate the first and second positions as the cutting unit 118 is pivoted from the first position to the second position, or vice versa.

The angle between the circular saw blade 120 and the plane in which lie the workpiece abutment surfaces 138a and 138b of the workpiece fence 136 may be adjusted by adjusting the rotational position of the table portion 114 relative to the base portion 112. The workpiece fence 136 is connected to the base portion 112 and does not change position on rotation of the table portion 114. Thus, adjustment of the rotational position of the table portion 114 allows for the completion of angled or "miter" cuts through a workpiece supported against one or both workpiece abutment surfaces 138a and 138b. The miter saw 100 also may incorporate a bevel adjustment mechanism, generally indicated as 140, which may include a bevel angle indicator 141 having a construction known in the art. The bevel adjustment mechanism 140 provides for adjustment of the angle of inclination of the circular saw blade 120 relative to the workpiece support surface 134 about a bevel axis A—A.

It will be understood that an operator may execute a desired cut through a workpiece by configuring the miter saw 100 to a desired miter and/or bevel angle and then placing the workpiece (not shown) on the workpiece support surface 134 of the table portion 114 and against the workpiece abutment surfaces 138a and/or 138b of the workpiece fence 136. The operator then powers the cutting unit 118 to forcefully rotate the circular saw blade 120 and pivots the cutting unit 118 to the second position so that the saw blade 120 passes through the workpiece at a desired location and angle.

Figure 5:
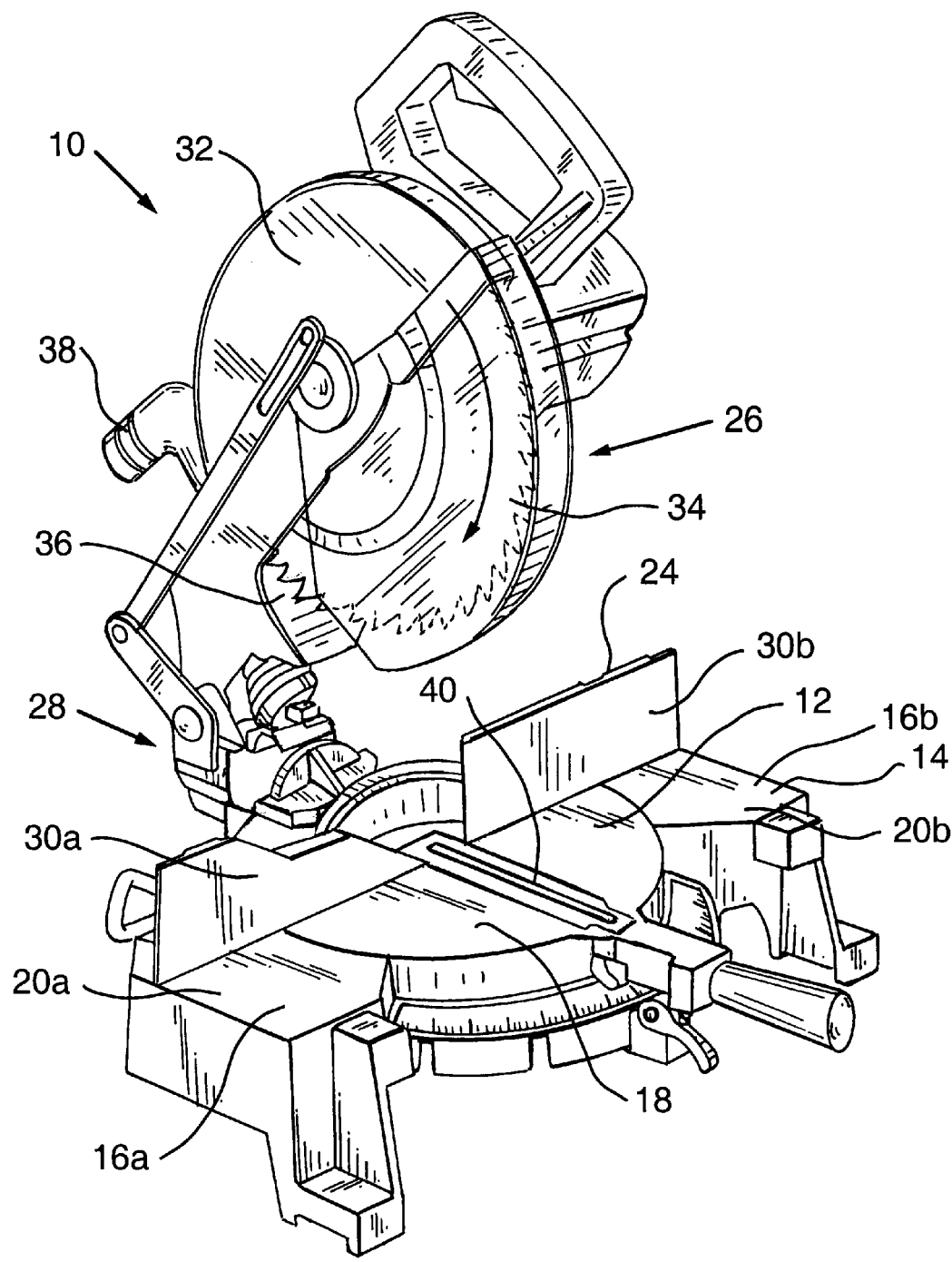
FIG. 5 is a perspective view of a prior art compound miter saw including a conventional dust collection system.

By inspecting the manner of operation of miter saws such as miter saw 10 of FIG. 5, the inventors have observed the following regarding sawdust dispersal patterns of existing miter saws. With reference to the prior art miter saw of FIG. 5., as the rotating circular saw blade 34 contacts a workpiece disposed on the workpiece support surfaces 18, 20a, 20b of the miter saw 10, sawdust is generated and is dispersed both by the rotation of the saw blade 34 (direction indicated by the curved arrow) and by the airflow generated by the rotating saw blade 34. As the cutting unit 32 of the miter saw 10 is pivoted downward and the rotating circular saw blade 34 initially contacts the workpiece, sawdust is generally dispersed rearward (i.e., in a direction away from the operator) in a wide, generally conical pattern wherein the apex of the cone is approximately at the point of contact between the circular saw blade 34 and the workpiece. As the saw blade 34 is pivoted downward and advances further into the workpiece, a channel having the thickness of the kerf is cut through the workpiece. The channel funnels the sawdust so that it is directed rearward in a generally conical pattern that is more unified and less dispersed than the conical pattern experienced upon initial contact between the saw blade 34 and the workpiece. Finally, as the saw blade 34 emerges from the bottom surface of the workpiece and enters the blade slot 40 in the surface 18, the sawdust again assumes a wider conical dispersal pattern.

The characteristics of the foregoing sawdust dispersal patterns should be considered general in nature only and are not indicative of all possible sawdust dispersal patterns. Differences in the shape, size, and positioning of the workpiece, for example, will affect the dispersal patterns. Nevertheless, the inventors have observed that the above-described dispersal patterns are illustrative of the following aspects of sawdust dispersal pattern believed to be common to the operation of all conventional chop saws and miter saws. First, the inventors have observed that the area of dispersal of the sawdust widens with increasing distance rearward from the region of contact between the saw blade and the workpiece. Second, the inventors have observed that a significant fraction of the sawdust generated by the saw blade is propelled downward relative to a midline of the saw blade. As used herein, the midline of the saw blade refers to a diameter line of the saw blade that is generally parallel to the workpiece supporting surface of the table portion of the miter saw when the cutting unit is pivoted downward fully toward the table portion. (For example, the midline of the saw blade 120 of the miter saw 100 is indicated as "ML" in FIG. 2.) The sawdust inlets of sawdust collection systems incorporated in known miter saws typically are positioned on the saw's cutting unit some distance to the rear of the saw blade and do not extend significantly below the midline of the saw blade. An example of such designs is provided in the prior art miter saw 10 of FIG. 5, wherein the inlet 36 is well behind the saw blade 34 and the bottom edge of the inlet 36 extends only slightly below the midpoint of the saw blade 34. The practical effect of the positioning of known sawdust collection system inlets is that a substantial amount of sawdust is uncollected by those known systems during cutting operations.

Figure 7:
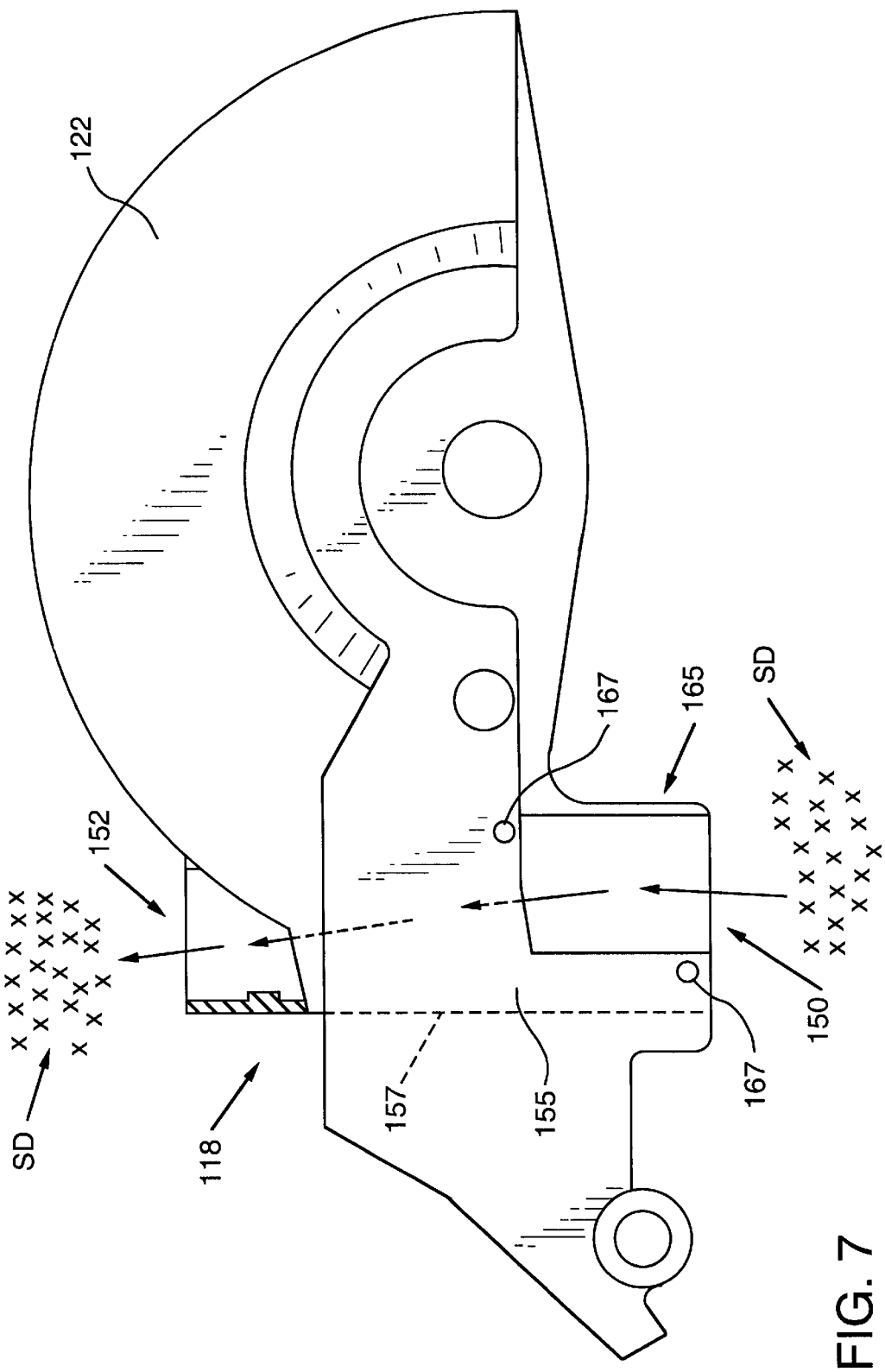
FIG. 7 is an elevational view of the cutting unit of the compound miter saw shown in FIGS. 1–4, with the collector and outlet chute removed, and illustrating the dust transmission pathway of the dust collection system.

The unique sawdust collection system of the present invention greatly enhances the amount of sawdust collected. An embodiment of a sawdust collection system constructed according to the invention is shown in FIGS. 1, 2, 4, and 8 incorporated in miter saw 100. The sawdust collection system includes inlet 150 and outlet 152 (visible in FIG. 7) located in cutting unit 118. A sawdust transmission pathway is defined within the cutting unit 118 between the inlet 150 and the outlet 152. The sawdust transmission pathway is identified as 155 in FIG. 7, which is an elevational view of the cutting unit 118 of the miter saw 100. An interior space is defined within the cutting unit 118 bounded by an internal wall, the position of which is indicated at as 157. It will be understood that the sawdust particles "SD" propelled into the inlet 150 and through the sawdust transmission pathway 155 may be collected at the outlet 152 in, for example, a collection bag or by a vacuum device.

Figure 6:
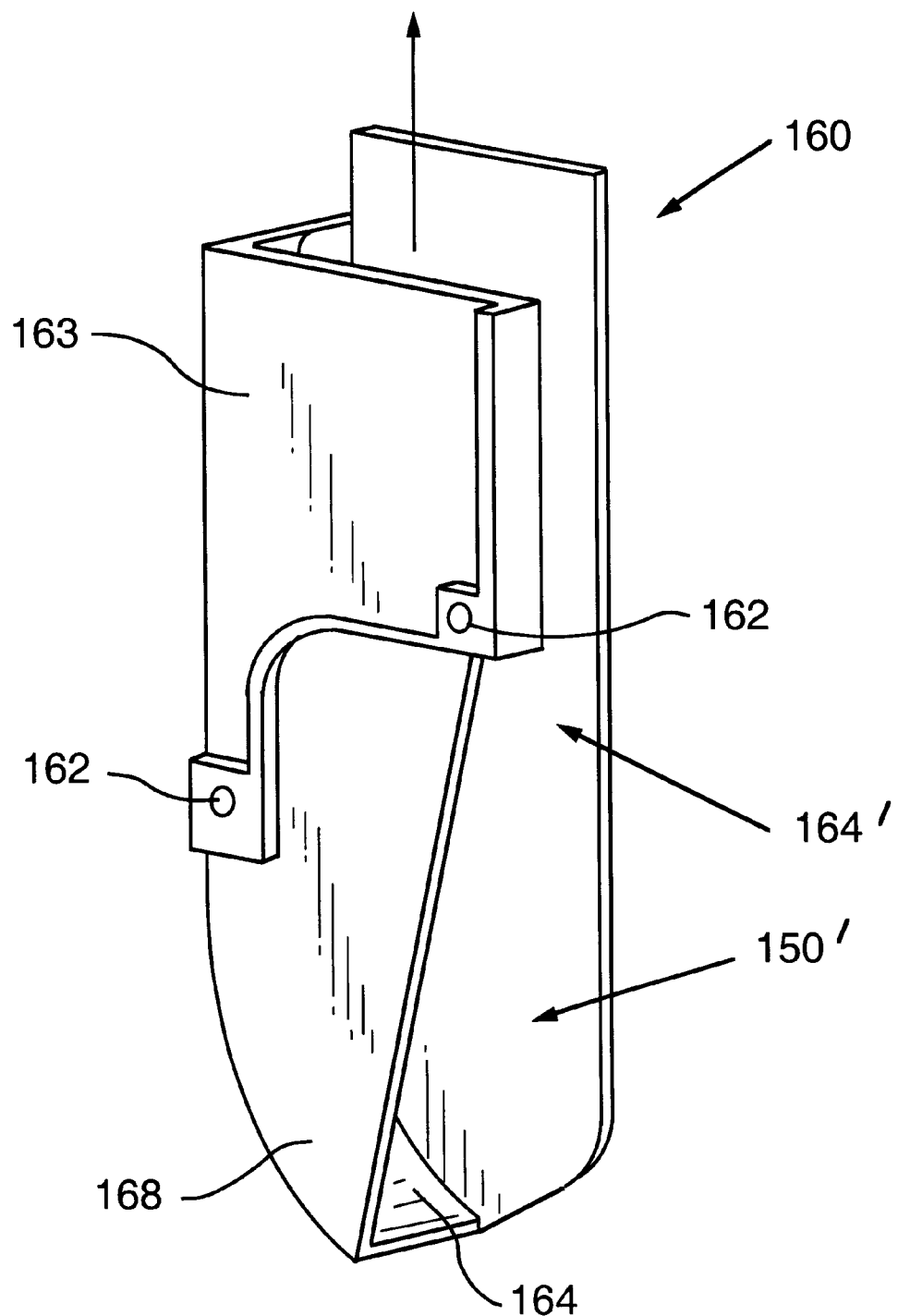
FIG. 6 is a perspective view in isolation of the dust inlet insert of the compound miter saw shown in FIG. 1.

In miter saw 100, an angled port 154 may be affixed to the cutting unit 118 to receive sawdust particles SD exiting through the outlet 152 as shown in FIG. 2. The port 154 has been removed in FIG. 7 for clarity. As is well known in the art, the port 154 may be angled to reduce the velocity of sawdust exiting the outlet 152. A collector 160 is positioned at the inlet 150 of the miter saw and communicates with the inlet 150 so that access to the inlet 150 is through the collector 160. The collector 160, which is shown in isolation in FIG. 6, may be a unitary piece that is secured to the cutting unit 118 for travel therewith. For that purpose, a mounting region 163 of the collector 160 may be secured to a region 165 of the cutting unit by fasteners 161 (see for example, FIGS. 1, 4, and 6). The fasteners 161 are secured through mounting bores 162 in the collector 160 and aligned bores 167 on the region 165 of the cutting unit 118. This embodiment of the collector 160 has a collector inlet 150' and a curved surface 164 which forms a chute portion 164' which directs the sawdust entering the collector inlet 150' along the path generally indicated by the arrow in FIG. 6 and directs the sawdust into the sawdust transmission pathway 155 toward the outlet 152 in the cutting unit 118. The collector 160 may be fabricated from, for example, a rigid plastic material or another material suitable for its application. Although as incorporated in a miter saw 100, the collector 160 is a single piece insert attached to the cutting unit 118 for travel therewith, it will be understood that other arrangements are possible. For example, the collector 160 may be an integral portion of the cutting unit 118 that extends toward the saw blade 120. The collector 160 is immediately adjacent to the circular saw blade 120 and actually overlaps a portion of the saw blade 120 in a region of the blade from which most of the sawdust is generated during cutting operations. As best shown in FIG. 2, the collector 160 also extends significantly below the midline of the circular saw blade 120. A comparison of the placement of the sawdust inlet of the present miter saw embodiment 100 and of the prior art miter saw 10 (compare, for example, FIGS. 1 and 5) illustrates these unique features of the present embodiment of the invention. Because access to the inlet 150' of the collector 160 is immediately adjacent to and also overlaps a region of the saw blade 120 that generates a significant portion of the sawdust, it will be understood that the sawdust is collected at a point where its dispersal pattern is restricted in area, making a very large dust inlet unnecessary. Also, because the collector inlet 150' extends significantly below the midline of the saw blade 120, sawdust that could not be collected by known sawdust collection systems, for example, the system of miter saw 10 of FIG. 5, may be collected. Thus, the dust collection system of the present invention provides a substantial improvement in the fraction of sawdust collected.

Figure 3:
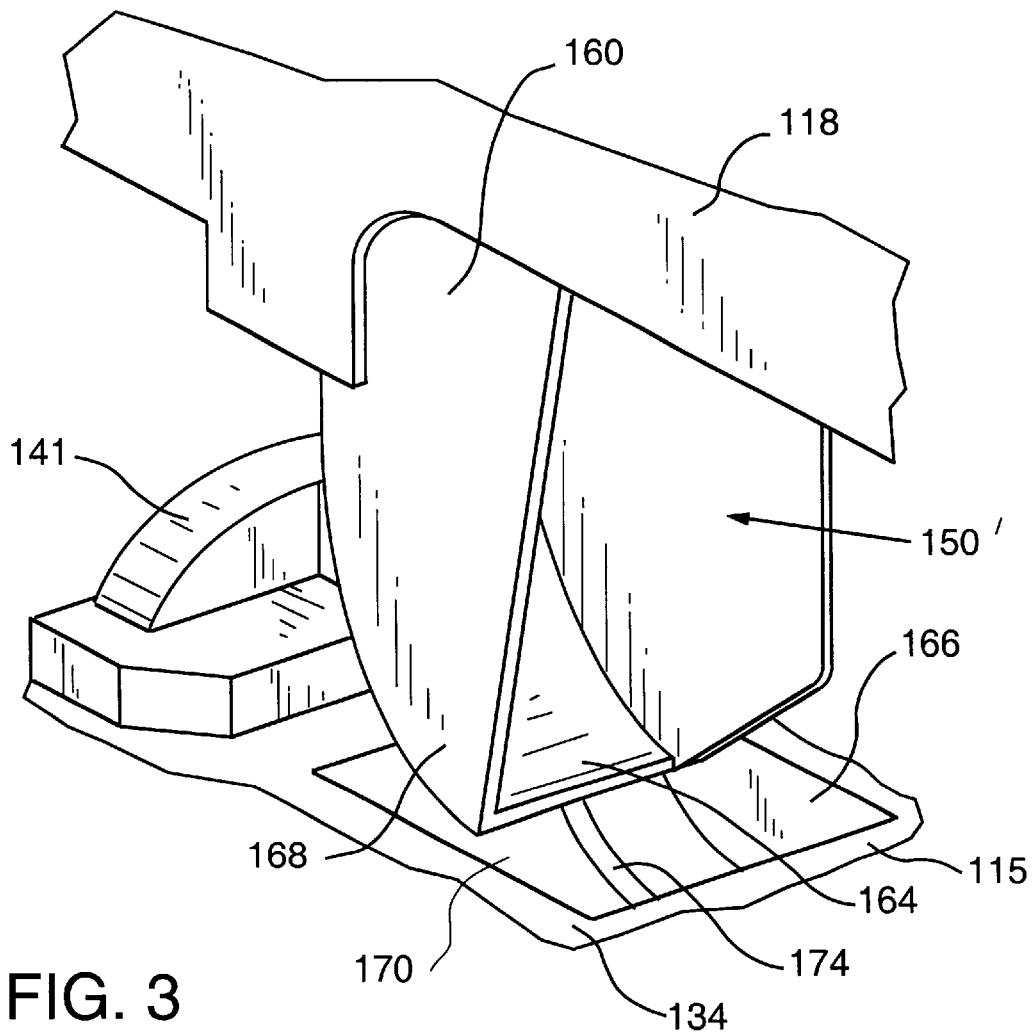
FIG. 3 is a magnified view of a portion of the compound miter saw shown in FIGS. 1 and 2 and, in particular, showing the relationship between the dust inlet and the dust inlet recess in the table portion when the saw unit is pivoted fully downward toward the workpiece support surface.
Figure 4:
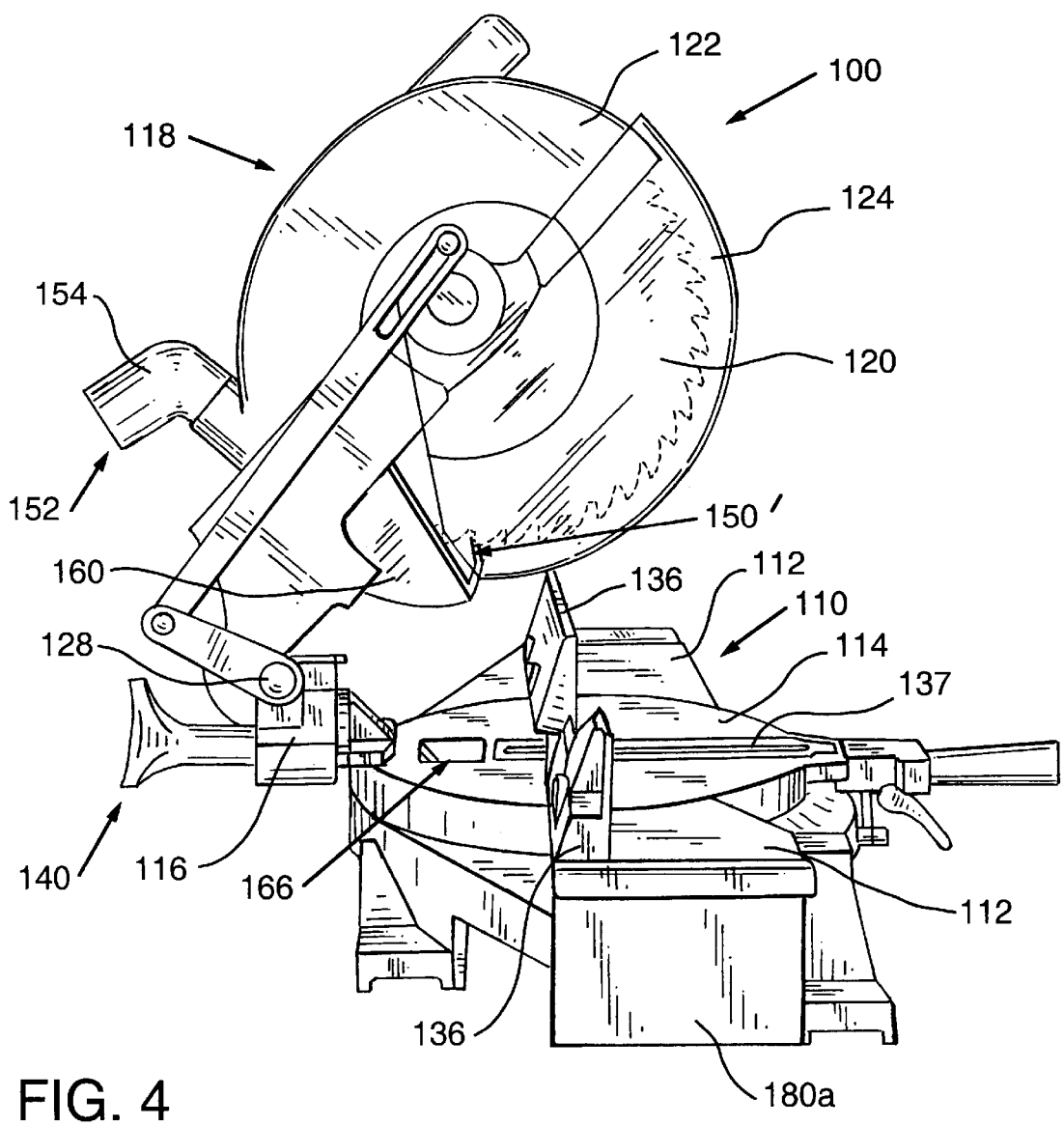
FIG. 4 is a side elevational view of the compound miter saw shown in FIGS. 1–3.
Figure 11:
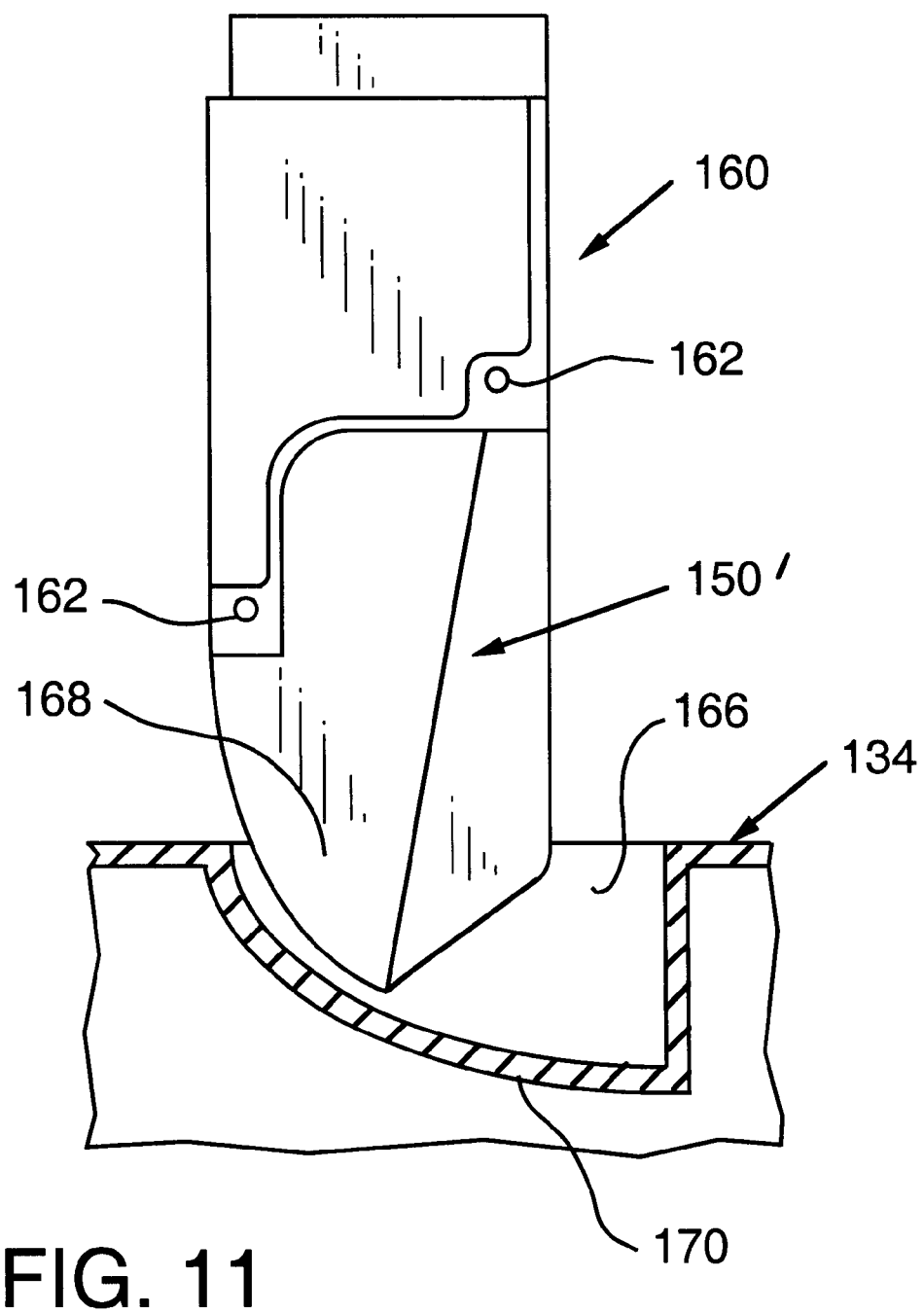
FIG. 11 is a side view in partial cross-section showing the relationship of the dust inlet and the recess in the table portion illustrated in FIG. 3.

The foregoing unique and advantageous positioning of the collector 160 is accommodated by modifications to the surface 115 of the table portion 114 of the miter saw 100. In particular, the surface 115 includes a recess 166 intermediate the slot 137 and the mounting assembly 116. The recess 166 extends below the planar surface 115 as shown in FIG. 1. As shown in FIG. 2 and in isolation in FIG. 3, the end region 168 of the collector 160 which defines the collector inlet 150' is disposed within the recess 166 when the cutting unit 118 is pivoted fully downward toward the workpiece support surface 134. As shown in FIG. 3, the recess may include a curved wall 170 generally conforming to the curved surface 164 of the collector 160. The positioning of the collector 160 within the recess 166 is also shown in FIG. 11, which is a cross-section through the recess 166. Absent the recess 166, the end region 168 of the collector 160 would impinge on the surface 115 of the table portion 114 as the cutting unit 118 is pivoted downward. As further shown in FIG. 3, the wall 170 of the recess 166 may include a slot 174 so that the sawdust may empty from the recess 166. So that the collector 160 will not impinge on the workpiece fence 136 as the cutting unit 118 is pivoted downward, the fence 136 is of the above-described two piece design wherein a gap is provided.

The dust collection system of the present invention provides a significant improvement over existing dust collection systems incorporated in miter saws and like devices. For example, the dust collection system of the present invention improves upon the performance of the current dust collection system of the Delta™ 36-210 10" Compound Miter Saw Model of FIG. 5 by greatly increasing the fraction of sawdust collected by the system. The result is a reduction in sawdust dispersal into the surroundings and a lessening of sawdust accumulation on the workpiece support surfaces and other surfaces of the miter saw.

Figure 9:
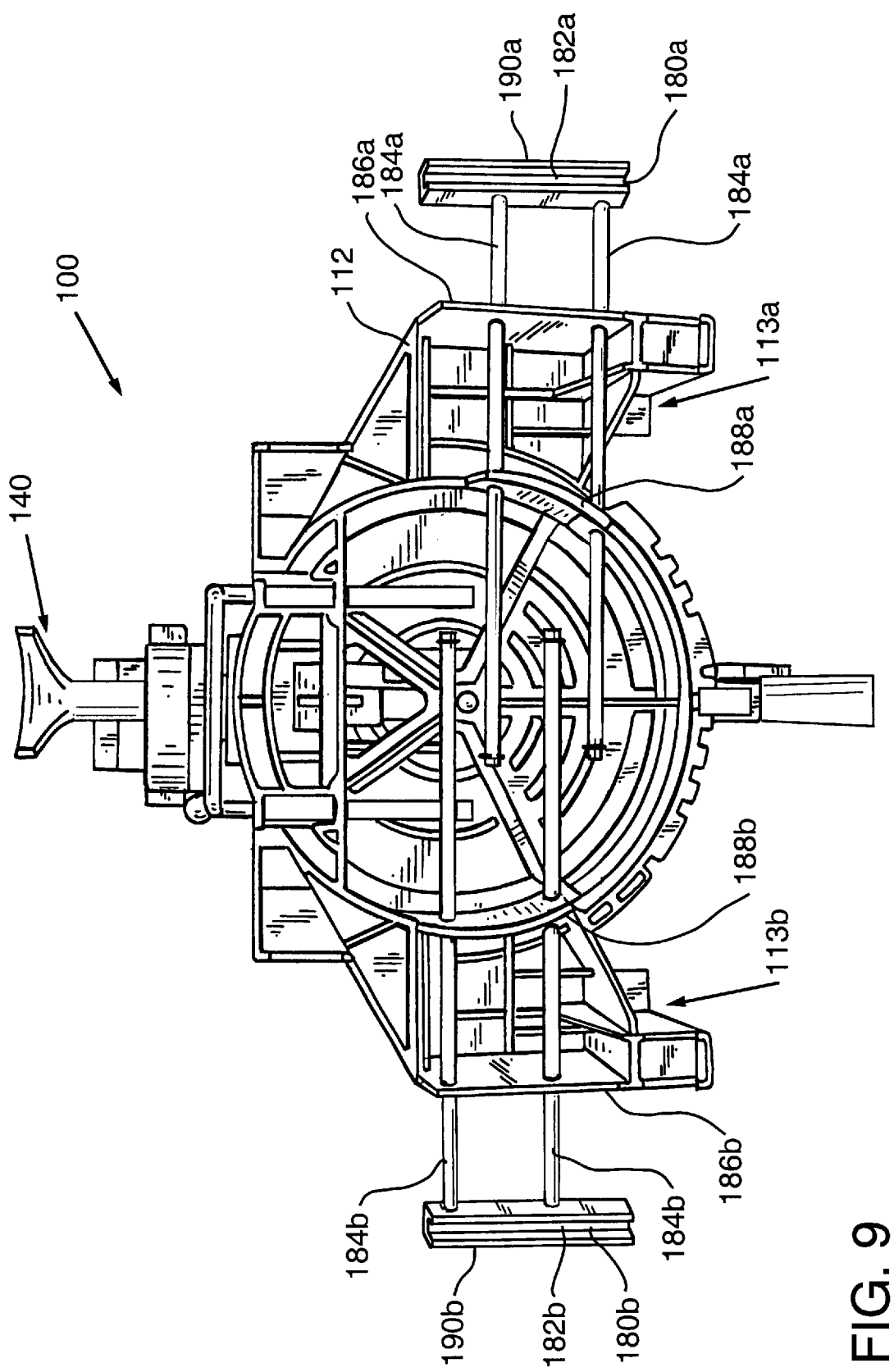
FIG. 9 is a bottom view of the compound miter saw shown in FIGS. 1–4 and 8 showing the mounting arrangement of the adjustable supports to the base portion, and wherein the adjustable supports are partially extended away from the side walls.
Figure 10A:
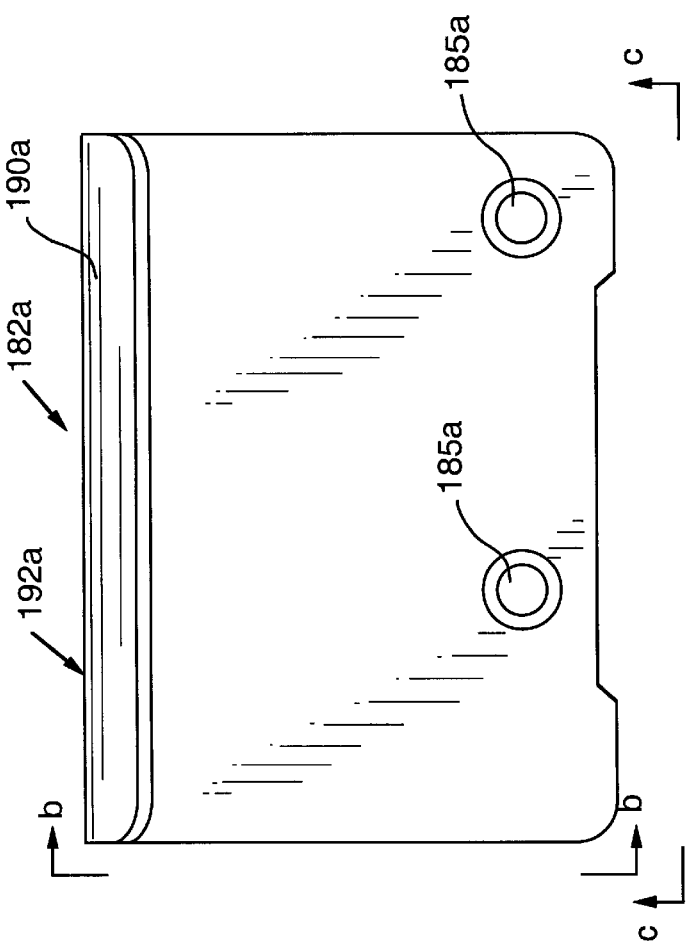
FIGS. 10(a)–(c) are views in isolation of a plate member of the compound miter saw shown in FIGS. 1–4, 8, and 9.
Figure 10C:
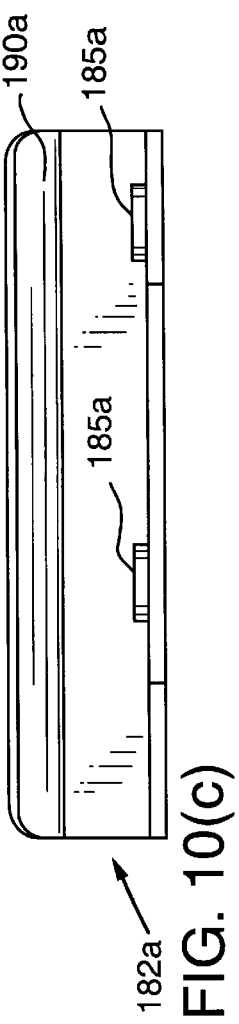
Figure 10B:
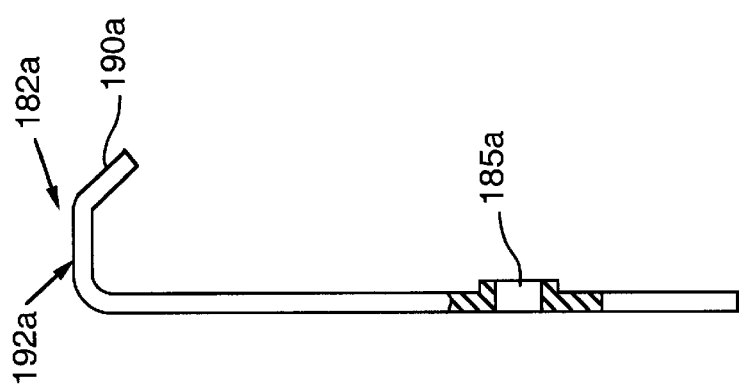

An additional unique feature incorporated in the miter saw 100 of the accompanying figures is an adjustable support system, which includes two adjustable support members 180a and 180b. One of the adjustable support members 180a, 180b is adjustably mounted on each side of the miter saw 100, but it will be understood that one or any reasonable number of such support members may be provided. Each adjustable support member 180a, 180b generally includes a support element in the form of a plate member 182a, 182b and two sliding members in the form of rods 184a, 184b. The construction of plate member 182a, which is identical to plate member 182b, is shown in FIGS. 10(a)–(c). The two rods 184a of the adjustable support member 180a, for example, are mounted to plate member 182a through bores 185a. Each adjustable support member is slidingly received by the base portion 112 as follows. As indicated in FIG. 9, the side portion 113a has a corresponding "right" side wall 186a and the side portion 113b has a corresponding "left" side wall 186b. Each of the left and right side walls 186a and 186b includes two bores to sliding receive the two rods of an adjustable support member. The bottom surface of the base portion 112 also includes projecting walls 188a, 188b, which also include two bores to slidingly receive the rod members of an adjustable support member. Thus, it will be understood from FIG. 9 that, for example, a distance between the plate member 182a of the adjustable support member 180a and the wall 186a may be adjusted by sliding rods 184a within the aligned bores of walls 186a and 188a.

Figure 12:
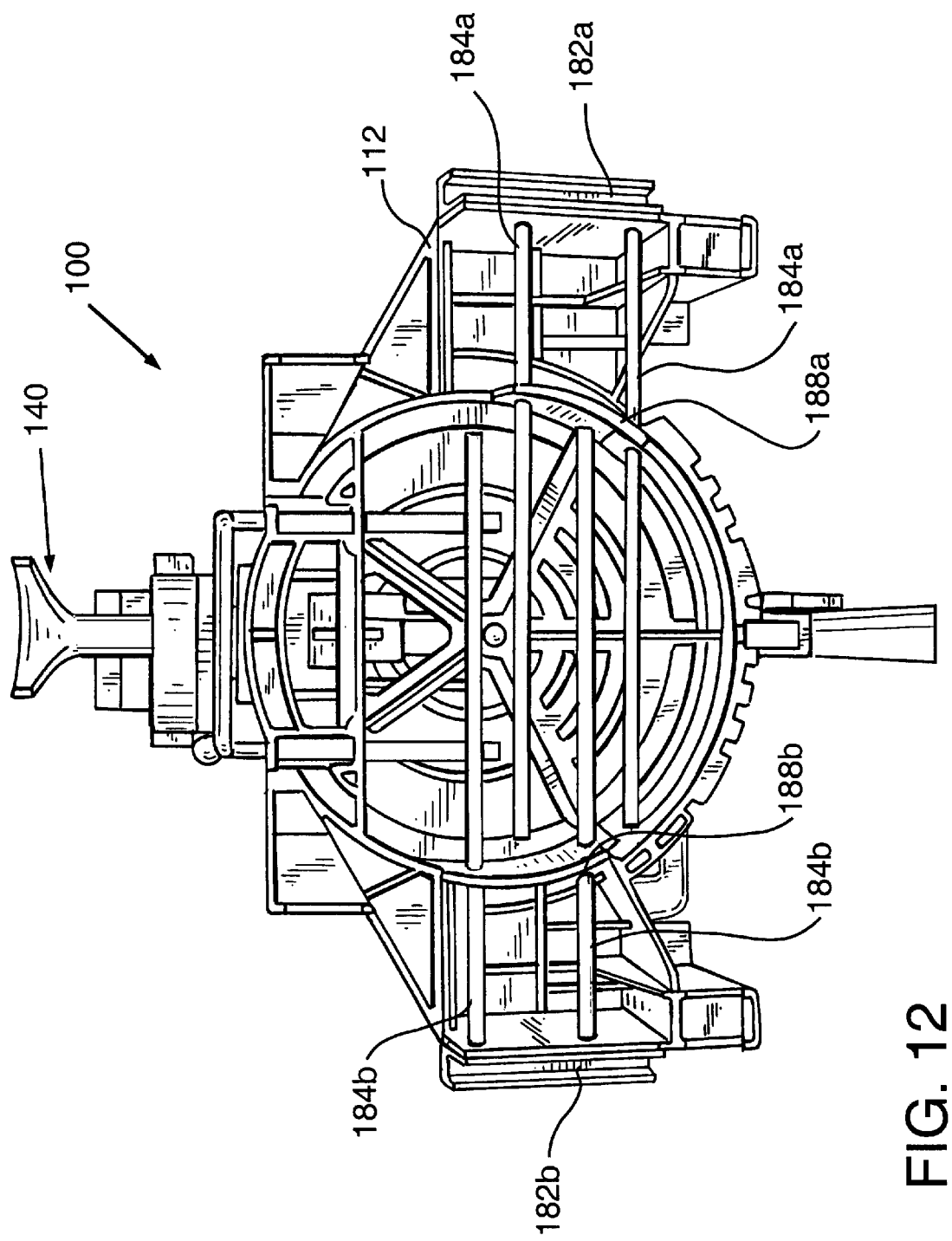
FIG. 12 is a bottom view of the compound miter saw in FIGS. 1–4, 8, and 9 showing the mounting arrangement of the adjustable supports to the base portion, and wherein the adjustable supports are not extended outward from the side walls.

FIGS. 1, 2 and 12 illustrate the adjustable support members 180a, 180b in a position abutting the adjacent side walls 186a, 186b, respectively. FIGS. 8 and 9 illustrate a position of both adjustable support members 180a, 180b partially extended outward from their respective side walls 186a, 186b. It will be understood that both adjustable support members 180a, 180b are independently adjustable, and one or both adjustable support members 180a, 180b may be extended outward away from their respective side walls in order to better support large workpieces being cut on the miter saw 100. To aid in supporting such workpieces, the plate members 182a, 182b of the adjustable support members 180a, 180b may each include a flange 190a, 190b, defining a support surface 192a, 192b that preferably is generally coplanar with the workpiece support surface 134.

Although the adjustable support members 180a, 180b have been described herein in connection with a miter saw, it will be apparent that similarly constructed support members may be incorporated in any device including a workpiece support surface for the purpose of better supporting workpieces of relatively large sizes. Such devices include, but are not limited to, those having a driven cutting or abrading member such as, for example, chop saws, radial saws, table saws, spindle sanders, drum sanders, disc sanders, planers, jointers, drill presses, planers, scroll saws, wood shapers, metalworking saws, tile cutting saws, and masonry saws. One of ordinary skill, without undue experimentation, may incorporate the adjustable support of the present invention in any such device based on the present description of the invention.

Referring again to the drawings, FIGS. 13–17 illustrate an additional embodiment of a cutting device, in the form of a miter saw 200, incorporating a dust collection system within the scope of the present invention. The miter saw 200 includes base 210 for supporting the miter saw 200 on a workbench or other surface. The base 210 includes abase portion 212 including two opposed side portion 213a and 213b. The base 210 also includes a table portion 214 having a surface 215. The table portion 214 is movably mounted to the base portion 212 and may rotate relative to the base portion 212, as indicated by the double-headed arrow in FIG. 14. The miter saw 200 also includes a mounting assembly 216 that is fixedly mounted to the rear of the table portion 214. A tool unit in the form of a cutting unit 218 includes a cutting member in the form of a circular saw blade 220, a fixed guard 222 covering an upper portion of the saw blade 220, and a transparent movable guard 224 that movably covers a lower portion of the saw blade 220. The circular saw blade 220 is selectively driven to rotate by motor 226, which is mounted on the cutting unit 218. The cutting unit 218 is movably connected to the mounting assembly 216 at a pivot axis 228. As further explained below, the mounting assembly 216 allows the cutting unit 218 to pivot and assume bevel positions relative to the table portion 214.

Figure 14:
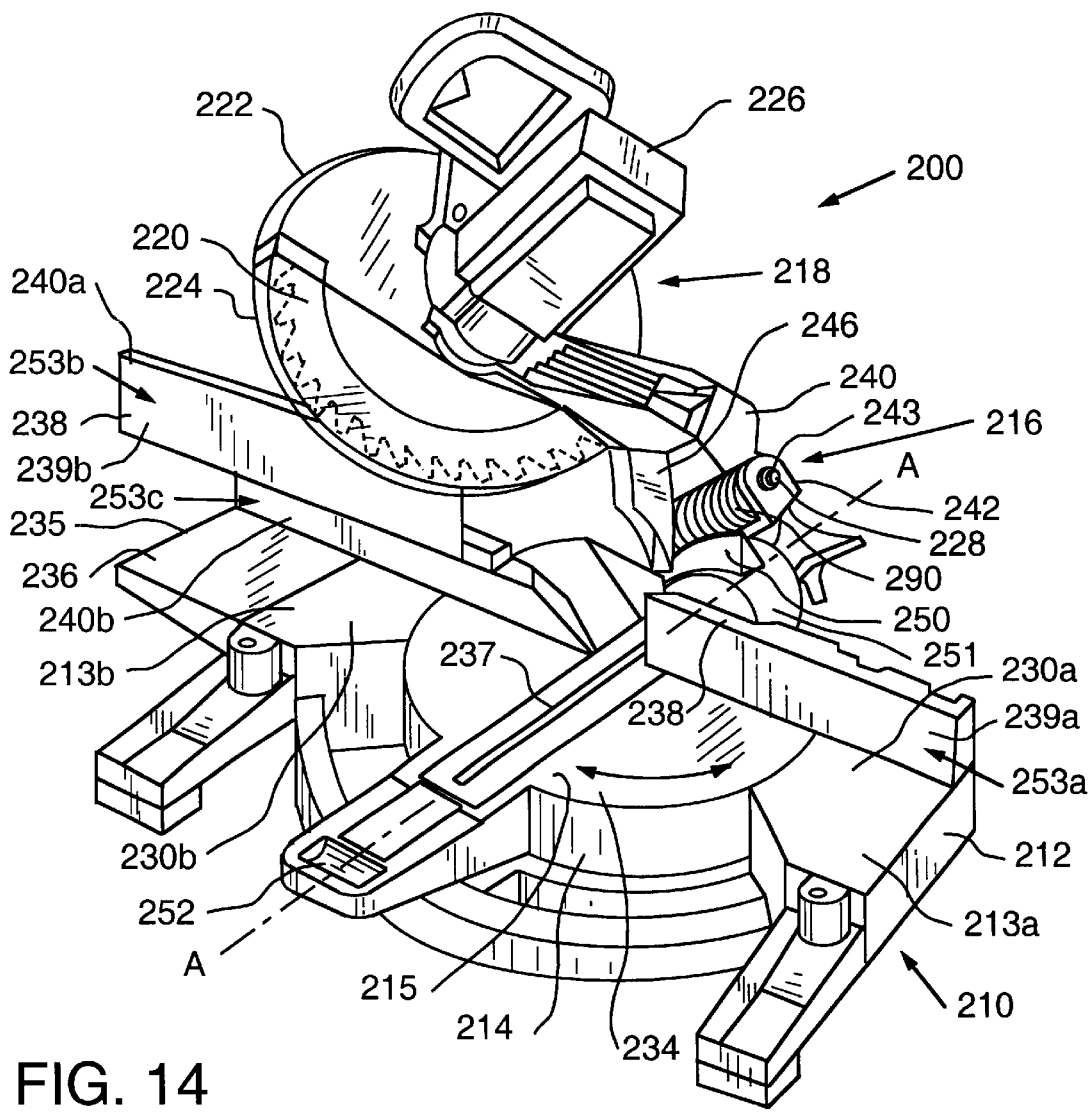
FIG. 14 is a perspective view, taken from the front and above, of the compound miter saw depicted in FIG. 13, and wherein the saw unit is shown at a 45° left bevel angle.

The side portion 213a and 213b include upper surfaces 230a and 230b, respectively. As shown in FIG. 14, a removable extension 235 including an upper surface 236 extends from the left side portion 213b. The surfaces 215, 230a, 230b, and 236 are generally coplanar and together form a workpiece support surface 234 on which a workpiece to be cut by the miter saw 200 is supported. Depending on the size of the workpiece to be cut by the miter saw 200, the workpiece may be supported only on the surface 215 or, alternately, on the surface 215 in combination with one or more of the surfaces 230a, 230b, and 236. As indicated in FIG. 14, the surface 215 includes a slot 237 which may receive a portion of the circular saw blade 220 when the cutting unit 218 assumes certain positions. The miter saw 200 also includes a workpiece fence 238 comprised of fence members 239a and 239b, against which a workpiece may be supported during cutting operations. The fence member 239b includes upper and lower members 240a and 240b, respectively, and the upper member 240a is laterally adjustable to accommodate bevel positions of the cutting unit 218.

An end 240 of the cutting unit 218 is received within a fork 242 of the mounting assembly, and an axle 243 is received through aligned bores in the end 240 and the fork 242 defines the pivot axis 228. The cutting unit 218 may pivot about the pivot axis 228 relative to the mounting assembly 216 and the table portion 214, to which the mounting assembly 216 is attached. Thus, the cutting unit 218 may be positioned in a first position, a second position, and any of the various positions intermediate the first and second positions. In the first position, shown in the side elevational view of FIG. 13, the cutting unit 218 is pivoted fully upward and away from the workpiece support surface 234. Miter saw 200 includes a biasing spring 290 within the fork 242 which biases the cutting unit 218 toward the first position, i.e., in a direction away from the workpiece support surface 234. In the second position, the cutting unit 218 is pivoted about the pivot axis 228 fully downward toward the workpiece support surface 234, and a portion of the circular saw blade 220 passes into the slot 237 in the table portion 214. The cutting unit 218 also passes through each of the positions intermediate the first and second positions as the cutting unit 218 is pivoted from the first position to the second position, or vice versa.

The angle between the circular saw blade 220 and a plane including the workpiece abutment surfaces 253a, 253b, and 253c of the workpiece fence 238 may be varied by adjusting the rotational position of the table portion 214 relative to the base portion 212. In that way, miter cuts may be made using the miter saw 200. Controls for adjusting and locking the rotational position of the table portion 214 relative to the base portion 212 are provided in the extending portion 252 which projects from the table portion 214. Miter saw 200 also incorporates a bevel adjustment mechanism, generally indicated as 254, by which the angle of inclination of the circular saw blade 220 relative to the workpiece support surface 234 may be adjusted. In operation, the miter saw 200 is first configured to the desired miter and/or bevel angles. The cutting unit 218 is then powered to forcefully rotate, and the cutting unit 218 is pivoted to the second position so that the saw blade 220 passes through a workpiece disposed on the workpiece support surface 234.

Figure 13:
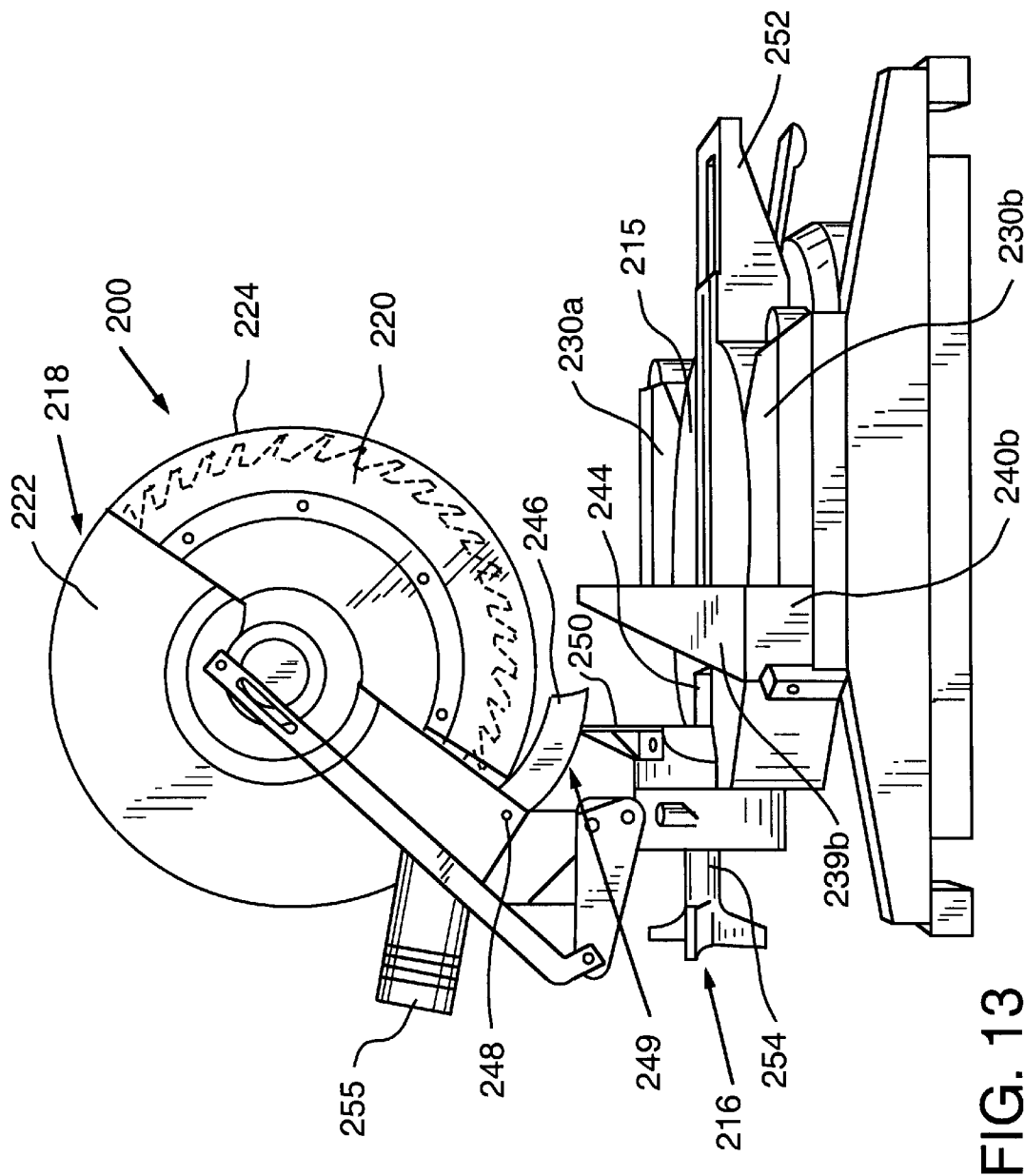
FIG. 13 is a left side elevational view of another embodiment of a compound miter saw including a dust collection system constructed according to the present invention, and wherein the saw unit is pivoted upward and away from the saw's workpiece support surface.

As indicated in FIG. 13, table portion 214 includes a recess 244 that is intermediate the slot 237 and the mounting assembly 216. As with miter saw 100 above, the recess 244 of the miter saw 200 receives a portion of a collector in the form of a dust chute 246 provided for channeling saw dust into a dust collection system of the saw. The dust chute 246 is pivotally connected to the cutting unit 218 and may swing relative to the cutting unit 218 about the axis defined by axle 248. A bottom surface 249 of the dust chute 246 rests on a dust chute support 250 mounted on a curved upper surface 251 of the mounting assembly 216. Thus, it will be understood that as the cutting unit 218 pivots between the aforesaid first and second positions, the orientation of the dust chute 246 relative to the cutting unit 218 will be altered. The dust chute 246 directs saw dust into a closed pathway (not shown) defined within the cutting unit 218 between a dust inlet and a dust outlet. The outlet of miter saw 200 is defined by port 255, which projects from a top surface of the cutting unit 218.

Figure 15A:
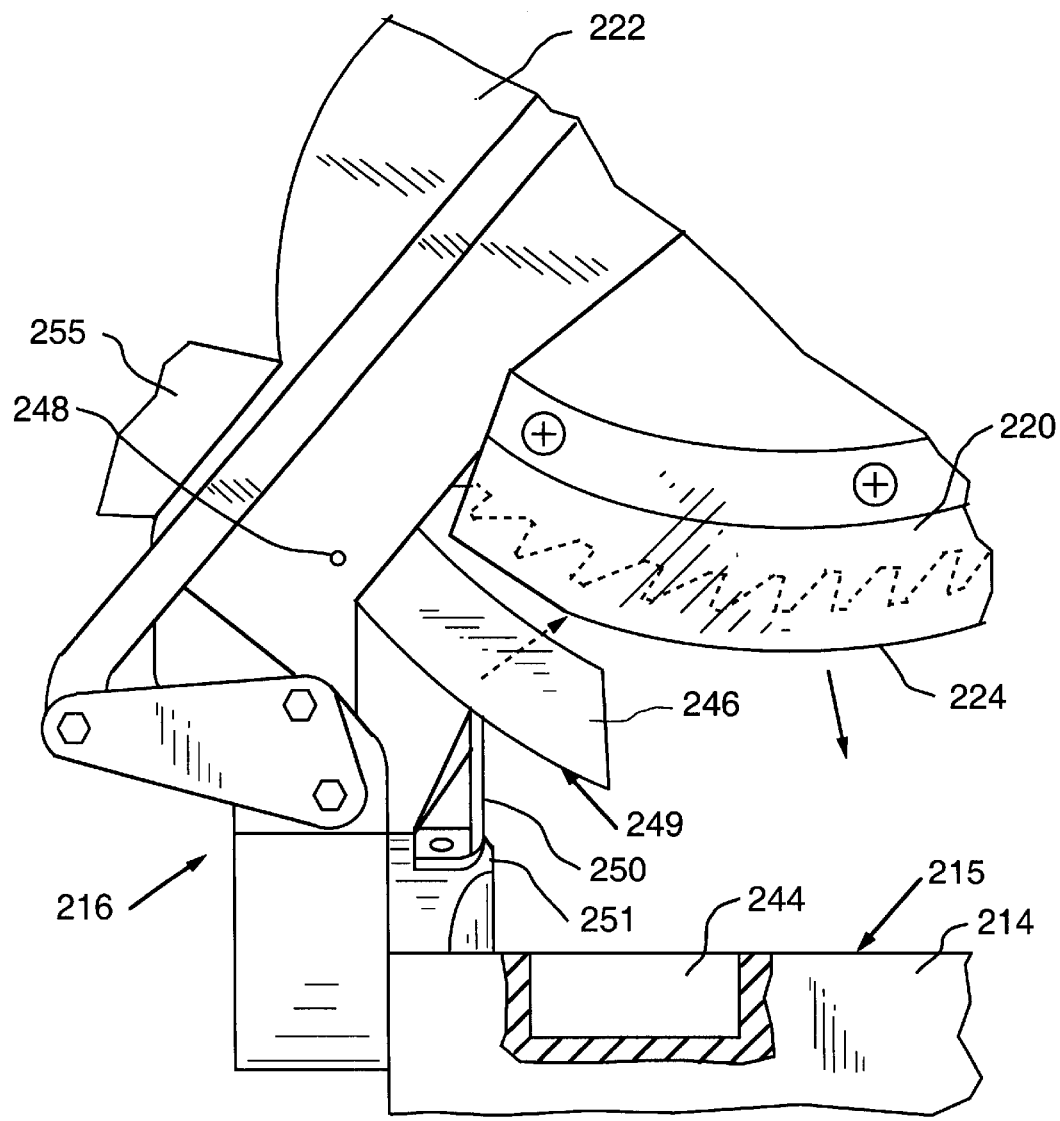
FIG. 15(a) is a view showing in partial cross-section a region of the compound miter saw depicted in FIG. 13, in the vicinity of the recess, movable dust chute, and dust chute support, and wherein the saw unit is pivoted full upward and away from the workpiece support surface.
Figure 15B:
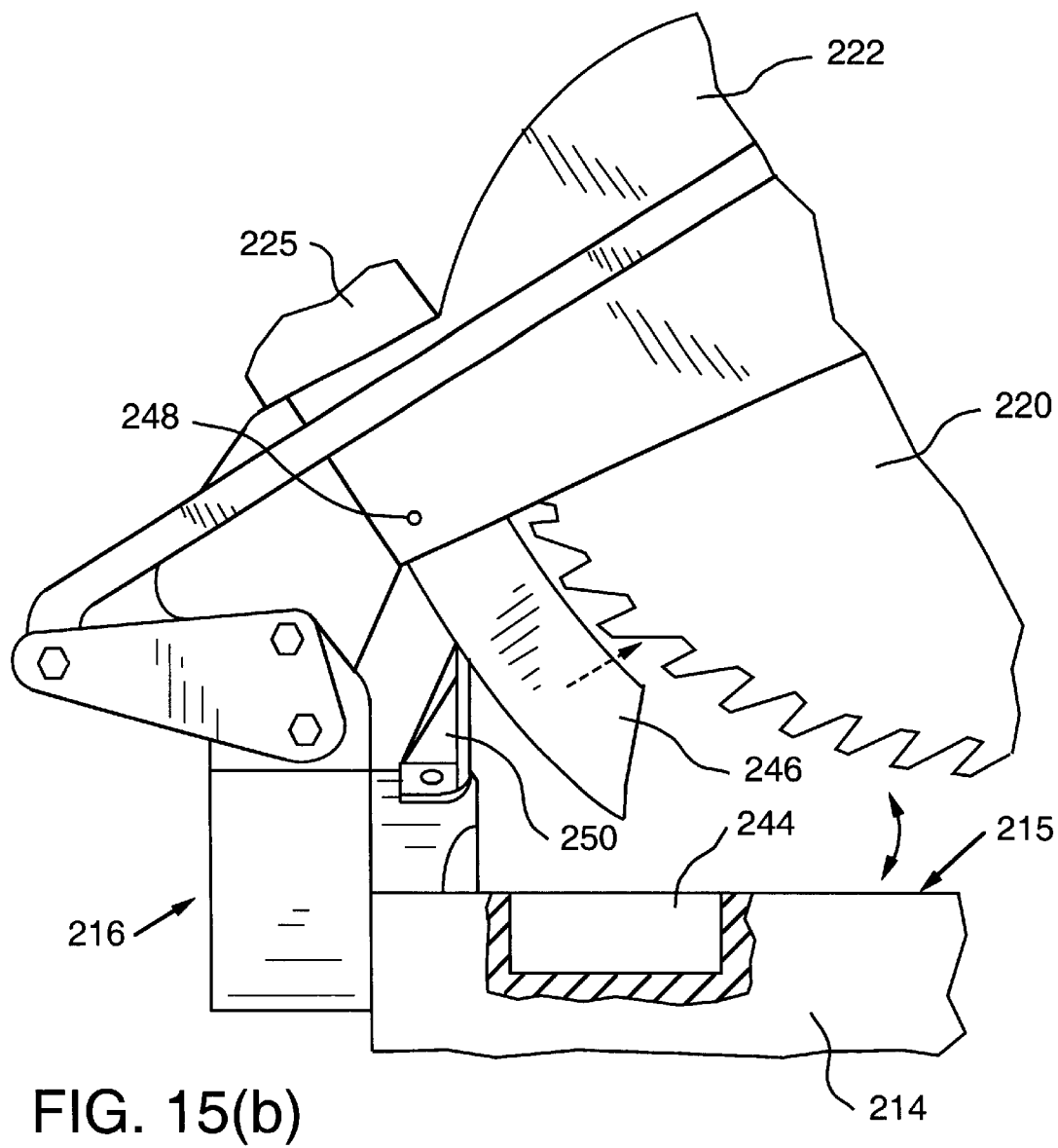
FIG. 15(b) is a view showing the compound miter saw region depicted in FIG. 15(a), but wherein the saw unit is pivoted downward toward the workpiece support surface to a position intermediate that of FIGS. 15(a) and 15(c)
Figure 15C:
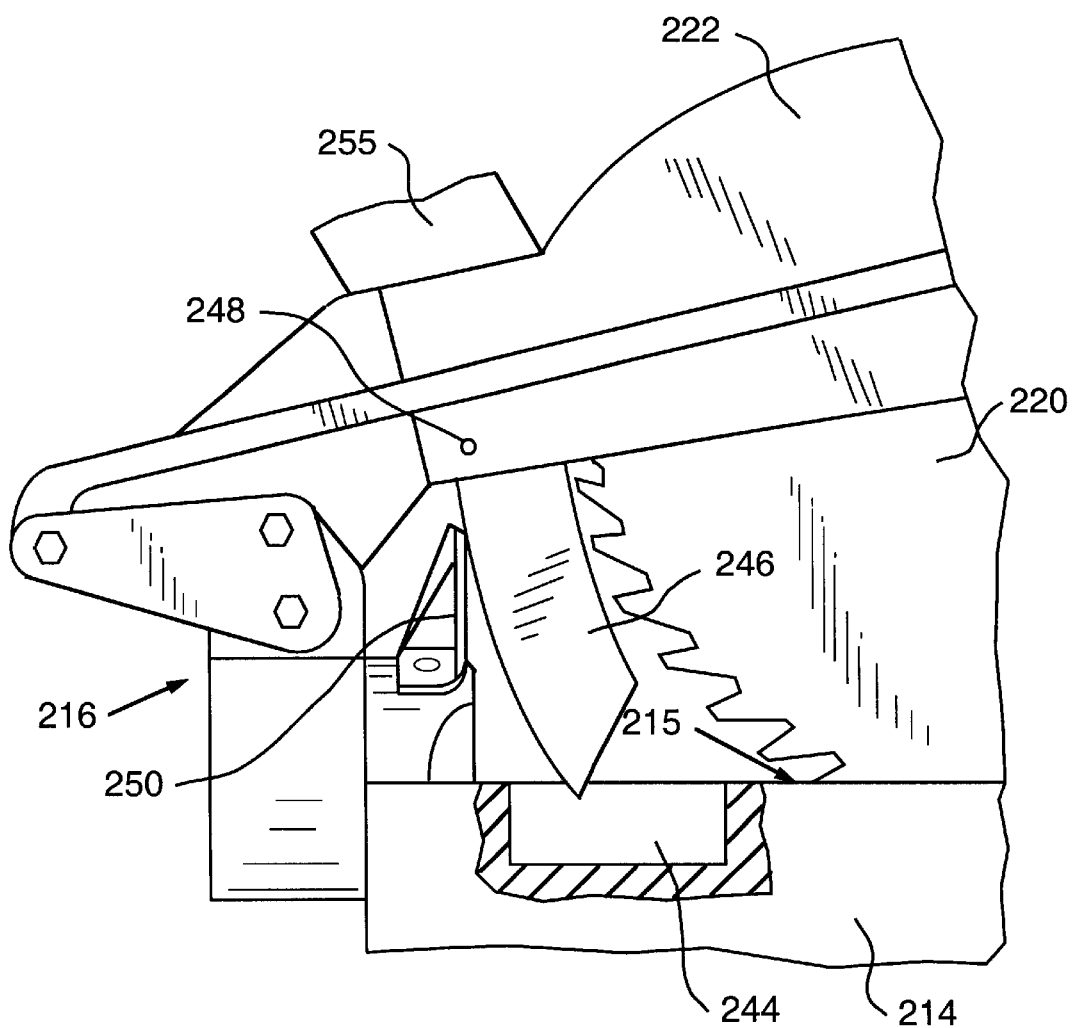
FIG. 15(c) is a view showing the compound miter saw region depicted in FIG. 15(a), but wherein the saw unit is pivoted fully downward and in the direction of the workpiece support surface.

The change in the orientation of the dust chute 246 is illustrated in FIGS. 15(a)–(c), which are views showing in partial cross-section a region of the miter saw 200 in the vicinity of the recess 244, movable dust chute 246, and dust chute support 250, and wherein the cutting unit is in a 0° bevel position. FIG. 15(a) illustrates the first position, and the curved arrow indicates the path of the cutting unit 218 as it pivots toward the second position. FIG. 15(c) illustrates the second position, in which the saw blade 220 is partially disposed within the slot 237 and below the surface 215, and further wherein an end portion of the movable dust chute 246 is received within the recess 244. FIG. 15(b) illustrates a position of the cutting unit 218 intermediate the first and second positions of FIGS. 15(a) and 15(c), respectively. In FIG. 15(b), the cutting unit 218 is shown in the process of pivoting toward or away from the table portion 214 along the path of the double-headed arrow. As the cutting unit 218 pivots from the first position (FIG. 15(a)), through the intermediate position (FIG. 15(b)), to the second position (FIG. 15(c)), the axle 248 about which the movable dust chute 246 swings approaches the dust chute support 250. This, in turn, causes the dust chute 246 to pivot toward the perimeter of the saw blade 220, in the direction of the dotted arrow. Thus, the dust chute 246 will move successively closer to the perimeter of the saw blade 220 as the saw blade 220 moves closer to the table portion toward completion of the cut through the workpiece.

The optimal locations of the dust chute 246 about the axle 248 at all locations along the arc of pivotal movement of the cutting unit (i.e., throughout the array of positions from the first to the second positions) may be designed into the miter saw 200 by selecting the geometry and/or the mounting location of the dust chute 246 and the dust chute support 250. The selection of a particular topography for the surface 249 of the dust chute 246, for example, will dictate the positioning of the dust chute 246 in the first, second, and intermediate positions relative to the perimeter of the saw blade 220. Locations that maximize the collection efficiency of the dust chute may thereby be "engineered" into the operation of the saw. Thus, the movement of the dust chute 246 resulting from the interaction of the surface 249 of the movable dust chute 246 and the dust chute support 250 may be designed into the miter saw 200 to optimize the saw dust collection capabilities of the miter saw 200.

The miter saw 200 also includes several of the advantageous saw dust collection features of miter saw 100 described above. For example, the dust chute 246 of the miter saw 200 may be received by the recess 244 in the table portion 214 and, therefore, may extend below a midline of the saw blade. In addition, a gap is defined between left and right portions of the workpiece fence 238 so that the dust chute 246 will not contact the fence 239 as the cutting unit 218 pivots toward the table portion 214.

Figure 16:
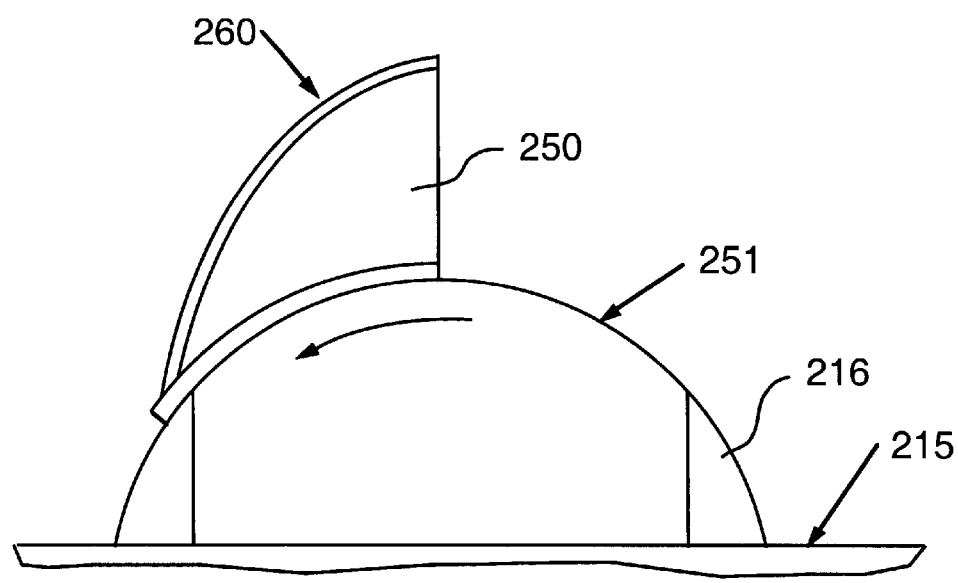
FIG. 16 is a view in isolation depicting in elevation the dust chute support of the miter saw depicted in FIG. 13 shown mounted on an upper perimeter of the bevel adjustment assembly of the saw.
Figure 17:
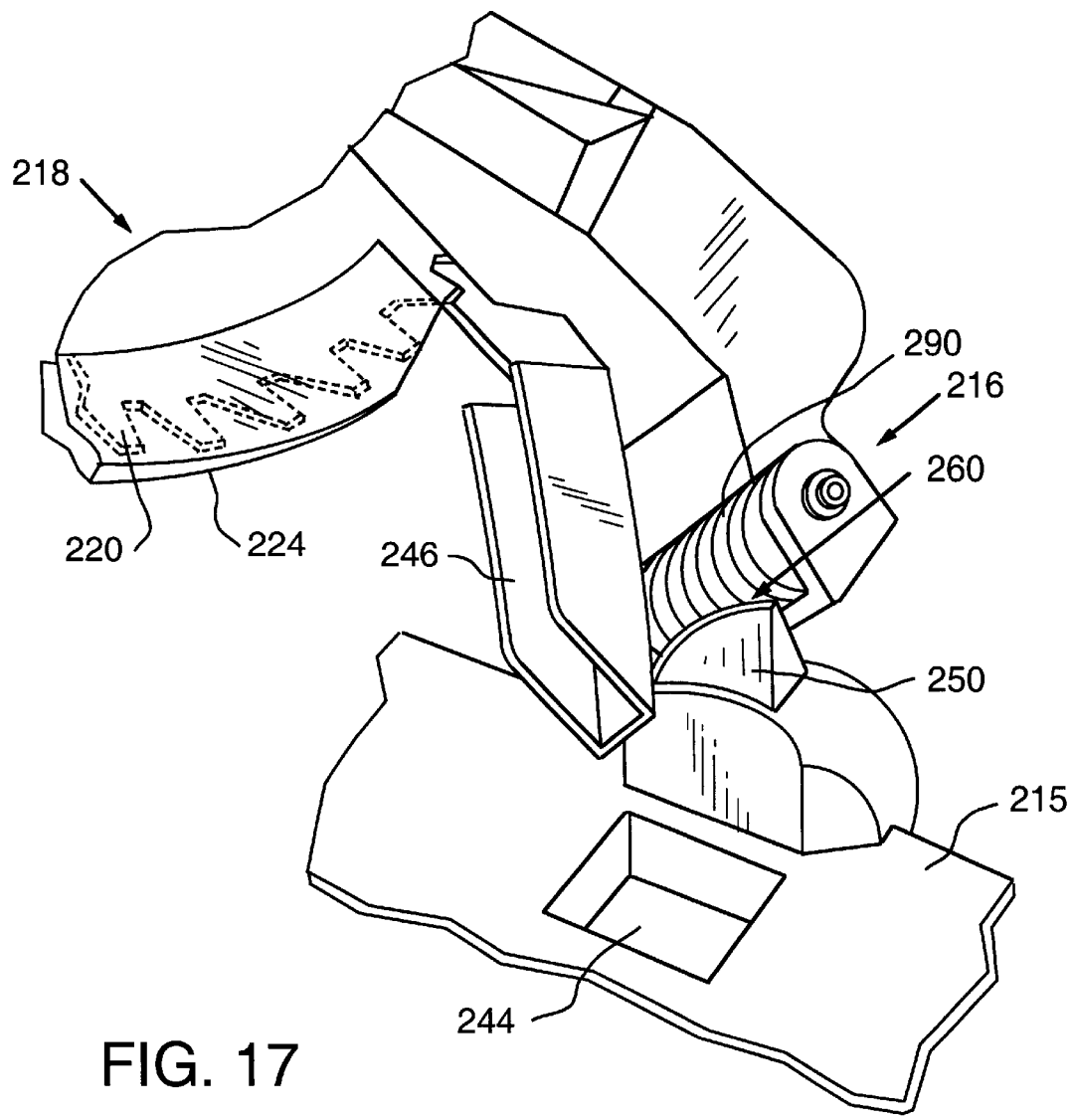
FIG. 17 is a perspective, partial fragmentary view of a region of the compound miter saw depicted in FIG. 13 illustrating the relationship of the workpiece support surface, table recess, saw unit, movable dust chute, and dust chute support, and wherein the saw unit is at a 45° left bevel angle and is pivoted fully upward and way from the workpiece support surface.

FIG. 16 illustrates the dust chute support 250 of the miter saw 200 attached to the surface 251 of the mounting assembly 216. FIG. 17 is a perspective view of a region of the miter saw 200 illustrating the relationship of the workpiece support surface, recess 244, saw unit 218, movable dust chute 246, and dust chute support 250, and wherein the saw unit is at a 45° left bevel angle and is pivoted fully upward and way from the workpiece support surface. The dust chute support 250 has a configuration reminiscent of a shark fin, with a curved upper surface 260. The curved surface 260 causes the dust chute 246 to move away from the perimeter of the saw blade 220 as the cutting unit is disposed at ever larger bevel angles, i e., in the direction of the arrow in FIG. 16. For example, when the cutting unit is in the first position, the dust chute 246 will be further from the perimeter of the saw blade 220 in a 45° bevel angle position (as in FIG. 14) than in a 0° bevel angle position (as in FIG. 13). This aspect of miter saw 200 is provided to ensure that the dust chute 246 does not contact the workpiece fence 238 when the cutting unit 218 is in a non-zero bevel angle position and is pivoted toward the table portion 214. The miter saw 200 depicted in the accompanying figures is a single bevel device. It will be understood that a symmetrically shaped dust chute support 250 may be provided in a dual bevel version of the miter saw 200.

Although the foregoing description of embodiments of the present invention is directed to miter saws including dust collection systems within the present invention, it will be apparent to those of ordinary skill upon reading the present description that the dust collection system of the present invention may be adapted for use in any device having a driven cutting or abrading member that generates a particulate matter as a workpiece supported on a workpiece support surface of the device is cut and/or abraded by the driven member. A non-exhaustive list of examples of such devices include chop saws (i.e., saws generally constructed in the manner of the device shown in FIG. 1, but lacking a miter angle adjustment), metalworking saws, tile cutting saws, and masonry saws. The adaptation of the present invention to such other devices may be accomplished by one of ordinary skill based upon the present description and without undue experimentation.

Although the adjustable support invention described herein is described in connection with a device also incorporating a dust collection system within the present invention, it will be readily apparent that a device may incorporate either invention singly, as in the case of the miter saw 200 described herein. Although not specifically disclosed in detail herein, each of the elements of the dust collection system and adjustable support inventions described herein may be constructed of materials appropriate for its particular application. For example, the collector 160 of miter saw 100 and the dust chute 246 of miter saw 200 may be constructed of a suitably rigid plastic material, and the plate members 182*a*, 182*b* and the rods 184*a*, 184*b* of the adjustable support invention may be constructed of a metal that will withstand the weight of a supported workpiece. The selection of suitable materials for the various elements of the inventions will be a matter of design choice within the level of ordinary skill. Applications of the devices in which the inventions are incorporated will, to some extent, dictate the choice of materials.

What is claimed is:

1. An apparatus comprising:
   a first member including a first surface, said first surface including a recess thereunder;
   a second member including a driven member mounted thereon, said second member movable relative to said first member between a first position and a second position, wherein said driven member is closer to said first surface in said second position than in said first position, said second member including an inlet and an outlet and an enclosed pathway between said inlet and said outlet; and
   a collector movably mounted to said second member, said collector disposed at and communicating with said inlet, at least a portion of said collector disposed within said recess when said second member is in said second position, wherein said collector is pivotable about an axle mounted on said second member and movable relative to said second member about said axle and wherein said collector changes orientation relative to said second member when said second member moves toward said first member by interacting with a collector support, said collector support being attached to said first surface.

2. An apparatus comprising:
   a base having a planar support surface including a recess having an arcuate lower wall that curves downward from a portion of said planar support surface;
   a mounting assembly attached to said base;
   a tool unit having a driven member rotatably mounted thereon, said tool unit movably mounted to said mounting assembly opposite said planar support surface and pivotable on said mounting assembly toward said planar support surface, said tool unit including an inlet, an outlet, and an enclosed pathway between said inlet and said outlet; and
   a collector connected to said tool unit for discharge into said inlet and wherein at least a portion of said collector is received by said recess as said tool unit pivots toward said planar support surface and wherein said collector is movable relative to said tool unit wherein said collector is pivotable about an axle mounted on said tool unit and movable relative to said tool unit about said axle and wherein said collector changes orientation relative to said tool unit when said tool unit moves toward to said base by interacting with a collector support mounted on said planar support surface.

3. An apparatus comprising:
   a first member including a first surface;
   a second member including a driven member mounted thereon, said second member movable relative to said first member between a first position and a second position, wherein said driven member is closer to said first surface in said second position than in said first position, said second member including an inlet and an outlet and an enclosed pathway between said inlet and said outlet; and
   a collector movably coupled to said second member at said inlet and communicating with said inlet, wherein said collector is pivotable about an axle mounted on said second member and movable relative to said second member about said axle, and wherein said collector changes orientation relative to said second member when said second member moves toward said first member from said first position to said second position and closer to said second position by interacting with a collector support attached to said first surface.

4. The apparatus of claim 3, wherein said second member includes a circular cutting member and said collector includes a chute portion that receives particulate matter generated as said circular cutting member contacts a workpiece disposed on said first surface and directs at least a portion of the particulate matter into said pathway and toward said outlet.

5. An apparatus, comprising:
   a first member;
   a second member supporting a driven member and being movably supported relative to said first member for selective pivotal travel about a pivot axis toward and away from said first member and further being selectively pivotable relative to said first member about a bevel axis, said second member including an inlet and an outlet and a pathway between said inlet and said outlet;
   a collector movably mounted to said second member, said collector disposed at and communicating with said inlet; and
   a collector support oriented on said first member for directing said collector in a desired orientation relative to said second member as said second member is pivoted about said pivot axis.

6. The apparatus of claim 5 further comprising said collector support oriented on said first member for directing said collector in a desired orientation relative to said first member as said second member is selectively pivoted about said bevel axis.

7. The apparatus of claim 6 wherein said collector support has at least one curved surface for contacting said collector as said second member is pivoted about said bevel axis.

8. The apparatus of claim 5 further comprising said collector support oriented on said first member for directing said collector in a desired orientation relative to said first member as said second member is pivoted about said pivot axis and said bevel axis.

9. A cutting apparatus comprising:
   a base;
   a table supported on said base;
   a mounting assembly coupled to said table;
   a cutting unit pivotably coupled to said mounting assembly for selective pivotal travel relative to said table about a pivot axis, said cutting unit supporting a driven cutting member and having an inlet end and an outlet end with a pathway therebetween; and
   a collector movably mounted to said cutting unit in communication with said inlet, wherein a said collector changes orientation relative to said cutting unit when said cutting unit moves toward said table by interacting with a collector support on said table.

10. The cutting apparatus of claim 9 wherein said driven cutting member is selected from the group consisting of a miter saw blase, a metal working saw blade, a tile cutting saw blade and masonry blade.

11. A cutting apparatus comprising:
    a base;
    a table supported on said base;
    a mounting assembly coupled to said table for selective pivotal travel relative thereto about a bevel axis;
    a cutting unit pivotable coupled to said mounting assembly for selective pivotal travel relative to said table about a pivot axis, said cutting unit supporting a driven cutting member and having an inlet end and an outlet end with a pathway therebetween;
    a collector movably mounted to said cutting unit in communication with said inlet; and
    a collector support member supported on said table for directing said collector into a desired orientation relative to said cutting unit as said cutting unit is pivoted about sa id pivot axis toward said table.

12. The cutting apparatus of claim 11 wherein said driven cutting member is selected from the group consisting of a miter saw blade, a metal working saw blade, a tile cutting saw blade and a masonry blade.

13. A cutting apparatus comprising:
    a base;
    a table supported on said base;
    a mounting assembly coupled to said table for selective pivotal travel relative thereto about a bevel axis;
    a cutting unit pivotable coupled to said mounting assembly for selective pivotal travel relative to said table about a pivot axis, said cutting unit supporting a driven cutting member and having an inlet end and an outlet end with a pathway therebetween;
    a collector movably mounted to said cutting unit in communication with said inlet; and
    a collector support supported on said table for directing said collector into a desired orientation relative to said cutting unit as said cutting unit and mounting assembly are pivoted relative to said table about said bevel axis.

14. The cutting apparatus of claim 13 wherein said collector support has at least one arcuate guide surface.

15. A cutting apparatus comprising:
    a base;
    a table supported on said base;
    a mounting assembly coupled to said table for selective pivotal travel relative thereto about a bevel axis;
    a cutting unit pivotable coupled to said mounting assembly for selective pivotal travel relative to said table about a pivot axis, said cutting unit supporting a driven cutting member and having an inlet end and an outlet end with a pathway therebetween;
    a collector movably mounted to said cutting unit in communication with said inlet; and
    a collector support supported on said table for directing said collector into a desired orientation relative to said cutting unit as said cutting unit is pivoted about said pivot axis and said bevel axis.

16. The cutting apparatus of claim 15 wherein said collector support has at least one arcuate guide surface.

* * * * *

UNITED STATES PATENT AND TRADEMARK OFFICE
CERTIFICATE OF CORRECTION

PATENT NO.     : 6,510,772 B2
DATED          : January 28, 2003
INVENTOR(S)    : Louis C. Brickner, Jr. et al.

It is certified that error appears in the above-identified patent and that said Letters Patent is hereby corrected as shown below:

<u>Column 9,</u>
Line 40, delete "sliding" and substitute therefore with -- slidably --.

Signed and Sealed this

Eleventh Day of November, 2003

JAMES E. ROGAN
*Director of the United States Patent and Trademark Office*